United States Patent
Sen et al.

(10) Patent No.: US 10,613,678 B1
(45) Date of Patent: Apr. 7, 2020

(54) INPUT DEVICE WITH HAPTIC FEEDBACK

(71) Applicant: Apple Inc., Cupertino, CA (US)

(72) Inventors: Yi-Heng Sen, San Jose, CA (US); Alex J. Speltz, San Francisco, CA (US); Alex M. Lee, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/133,350

(22) Filed: Sep. 17, 2018

(51) Int. Cl.
*G06F 3/041* (2006.01)
*G06F 3/044* (2006.01)
*G06F 3/01* (2006.01)
*G06F 3/0488* (2013.01)

(52) U.S. Cl.
CPC ............ *G06F 3/0416* (2013.01); *G06F 3/016* (2013.01); *G06F 3/044* (2013.01); *G06F 3/0412* (2013.01); *G06F 3/04883* (2013.01); *G06F 3/04886* (2013.01)

(58) Field of Classification Search
CPC .... G06F 3/0416; G06F 3/04886; G06F 3/016; G06F 3/0412; G06F 3/04883; G06F 3/044; G06F 3/03545; A63F 2003/0063; A63F 2009/241; G09B 21/001–009
See application file for complete search history.

(56) References Cited

U.S. PATENT DOCUMENTS

| | | | |
|---|---|---|---|
| 5,196,745 A | 3/1993 | Trumper | |
| 5,293,161 A | 3/1994 | MacDonald et al. | |
| 5,424,756 A | 6/1995 | Ho et al. | |
| 5,434,549 A | 7/1995 | Hirabayashi et al. | |
| 5,436,622 A | 7/1995 | Gutman et al. | |
| 5,483,261 A | 1/1996 | Yasutake | |
| 5,488,204 A | 1/1996 | Mead et al. | |
| 5,668,423 A | 9/1997 | You et al. | |
| 5,739,759 A | 4/1998 | Nakazawa et al. | |
| 5,825,352 A | 10/1998 | Bisset et al. | |

(Continued)

FOREIGN PATENT DOCUMENTS

| | | |
|---|---|---|
| CN | 101036105 A | 9/2007 |
| CN | 101409164 A | 4/2009 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Koosha Sharifi-Tafreshi
(74) *Attorney, Agent, or Firm* — Kubota & Basol LLP

(57) ABSTRACT

Haptic feedback can be provided to a user via an input device to give a user a richer interaction experience with the input device and host device. The input device can include a magnet and a host device can include an array of coils. The coils can be driven to generate a magnetic field (or one or more magnetic fields) that can exert a force on the input device to provide haptic feedback. In some examples, the haptic feedback can be a push force pushing the input device away from the device or a pull force pulling the input device toward the device. In some examples, the haptic feedback can guide the input device using lateral forces. The haptic feedback described herein can be used for writing, drawing or actuating virtual input controls in a user interface.

20 Claims, 8 Drawing Sheets

(56) References Cited

U.S. PATENT DOCUMENTS

| | | |
|---|---|---|
| 5,835,079 A | 11/1998 | Shieh |
| 5,842,967 A | 12/1998 | Kroll |
| 5,880,411 A | 3/1999 | Gillespie et al. |
| 6,084,319 A | 7/2000 | Kamata et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,342,880 B2 | 1/2002 | Rosenberg et al. |
| 6,373,465 B2 | 4/2002 | Jolly et al. |
| 6,388,789 B1 | 5/2002 | Bernstein |
| 6,438,393 B1 | 8/2002 | Suuronen |
| 6,445,093 B1 | 9/2002 | Binnard |
| 6,493,612 B1 | 12/2002 | Bisset et al. |
| 6,690,387 B2 | 2/2004 | Zimmerman et al. |
| 6,693,622 B1 | 2/2004 | Shahoian et al. |
| 6,777,895 B2 | 8/2004 | Shimoda et al. |
| 6,822,635 B2 | 11/2004 | Shahoian et al. |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,015,894 B2 | 3/2006 | Morohoshi |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,184,064 B2 | 2/2007 | Zimmerman et al. |
| 7,196,688 B2 | 3/2007 | Schena |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Haparnas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,663,607 B2 | 2/2010 | Hotelling et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian et al. |
| 8,081,156 B2 | 12/2011 | Ruettiger |
| 8,125,453 B2 | 2/2012 | Shahoian et al. |
| 8,154,537 B2 | 4/2012 | Olien |
| 8,169,402 B2 | 5/2012 | Shahoian et al. |
| 8,174,495 B2 | 5/2012 | Takashima et al. |
| 8,174,512 B2 | 5/2012 | Ramstein et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung et al. |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,469,806 B2 | 6/2013 | Grant et al. |
| 8,471,690 B2 | 6/2013 | Hennig et al. |
| 8,479,122 B2 | 7/2013 | Hotelling et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,654,524 B2 | 2/2014 | Pance et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,803,670 B2 | 8/2014 | Steckel et al. |
| 8,834,390 B2 | 9/2014 | Couvillon, Jr. |
| 8,836,502 B2 | 9/2014 | Culbert et al. |
| 8,836,643 B2 | 9/2014 | Romera Joliff et al. |
| 8,866,739 B2 | 10/2014 | Tsuboi et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,122,330 B2 | 9/2015 | Bau et al. |
| 9,134,796 B2 | 9/2015 | Lemmens et al. |
| 9,172,669 B2 | 10/2015 | Swink et al. |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,361,018 B2 | 6/2016 | Defazio et al. |
| 9,383,883 B2 | 7/2016 | Lee et al. |
| 9,396,629 B1 | 7/2016 | Weber |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |

(56) References Cited

U.S. PATENT DOCUMENTS

| | | |
|---|---|---|
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Birnbaum et al. |
| 9,513,704 B2 | 12/2016 | Heubel et al. |
| 9,535,500 B2 | 1/2017 | Pasquero et al. |
| 9,539,164 B2 | 1/2017 | Sanders et al. |
| 9,557,830 B2 | 1/2017 | Grant |
| 9,557,857 B2 | 1/2017 | Schediwy |
| 9,600,037 B2 | 3/2017 | Pance et al. |
| 9,607,491 B1 | 3/2017 | Mortimer et al. |
| 9,632,583 B2 | 4/2017 | Virtanen et al. |
| 9,707,593 B2 | 7/2017 | Berte |
| 9,829,981 B1 | 11/2017 | Ji |
| 9,875,625 B2 | 1/2018 | Khoshkava et al. |
| 9,904,393 B2 | 2/2018 | Frey et al. |
| 9,927,902 B2 | 3/2018 | Burr et al. |
| 9,940,013 B2 | 4/2018 | Choi et al. |
| 9,996,199 B2 | 6/2018 | Park et al. |
| 10,025,399 B2 | 7/2018 | Kim et al. |
| 10,037,660 B2 | 7/2018 | Khoshkava et al. |
| 10,437,359 B1 | 10/2019 | Wang et al. |
| 2003/0117132 A1 | 6/2003 | Klinghult |
| 2005/0036603 A1 | 2/2005 | Hughes |
| 2005/0230594 A1 | 10/2005 | Sato et al. |
| 2006/0017691 A1 | 1/2006 | Cruz-Hernandez et al. |
| 2006/0197753 A1 | 9/2006 | Hotelling |
| 2006/0209037 A1 | 9/2006 | Wang et al. |
| 2006/0223547 A1 | 10/2006 | Chin et al. |
| 2006/0252463 A1 | 11/2006 | Liao et al. |
| 2007/0106457 A1 | 5/2007 | Rosenberg |
| 2007/0152974 A1 | 7/2007 | Kim et al. |
| 2008/0062145 A1 | 3/2008 | Shahoian et al. |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0135164 A1 | 5/2009 | Kyung et al. |
| 2009/0166098 A1 | 7/2009 | Sunder |
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2009/0313542 A1 | 12/2009 | Cruz-Hernandez et al. |
| 2010/0116629 A1 | 5/2010 | Borissov et al. |
| 2010/0225600 A1 | 9/2010 | Dai et al. |
| 2010/0231508 A1 | 9/2010 | Cruz-Hernandez et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2011/0261021 A1 | 10/2011 | Modarres et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian et al. |
| 2012/0306824 A1 | 12/2012 | Horie |
| 2012/0319827 A1 | 12/2012 | Pance et al. |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0076635 A1 | 3/2013 | Lin |
| 2013/0207793 A1 | 8/2013 | Weaber et al. |
| 2013/0278401 A1 | 10/2013 | Flaherty et al. |
| 2014/0062948 A1 | 3/2014 | Lee et al. |
| 2014/0071086 A1* | 3/2014 | Lee .................. G06F 3/03545 345/174 |
| 2014/0125470 A1 | 5/2014 | Rosenberg |
| 2014/0168175 A1* | 6/2014 | Mercea .................. G06F 3/046 345/179 |
| 2015/0097800 A1 | 4/2015 | Grant et al. |
| 2015/0116205 A1 | 4/2015 | Westerman et al. |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0234493 A1 | 8/2015 | Parivar et al. |
| 2015/0277562 A1 | 10/2015 | Bard et al. |
| 2015/0293592 A1 | 10/2015 | Cheong et al. |
| 2015/0338919 A1 | 11/2015 | Weber et al. |
| 2015/0349619 A1 | 12/2015 | Degner et al. |
| 2016/0011664 A1 | 1/2016 | Silvanto et al. |
| 2016/0098107 A1 | 4/2016 | Morrell et al. |
| 2016/0171767 A1 | 6/2016 | Anderson |
| 2016/0209979 A1 | 7/2016 | Endo et al. |
| 2016/0224116 A1* | 8/2016 | Hagedorn ............. G09B 21/003 |
| 2016/0293829 A1 | 10/2016 | Maharjan et al. |
| 2016/0327911 A1 | 11/2016 | Eim et al. |
| 2016/0328930 A1 | 11/2016 | Weber |
| 2016/0379776 A1 | 12/2016 | Oakley |
| 2017/0003744 A1 | 1/2017 | Bard et al. |
| 2017/0024010 A1 | 1/2017 | Weinraub |
| 2017/0111734 A1 | 4/2017 | Macours |
| 2017/0249024 A1 | 8/2017 | Jackson et al. |
| 2017/0285843 A1 | 10/2017 | Roberts-Hoffman et al. |
| 2017/0337025 A1 | 11/2017 | Finnan |
| 2018/0014096 A1 | 1/2018 | Miyoshi |
| 2018/0029078 A1 | 2/2018 | Park et al. |
| 2018/0046249 A1 | 2/2018 | Peretz et al. |
| 2018/0074547 A1 | 3/2018 | Smadi et al. |
| 2018/0181204 A1 | 6/2018 | Weinraub |
| 2018/0181735 A1* | 6/2018 | Yang .................. G06F 21/32 |
| 2018/0194229 A1 | 7/2018 | Wachinger |

FOREIGN PATENT DOCUMENTS

| | | |
|---|---|---|
| CN | 101663104 A | 3/2010 |
| CN | 101872257 A | 10/2010 |
| CN | 201945951 U | 8/2011 |
| CN | 102349039 A | 2/2012 |
| CN | 203405773 U | 1/2014 |
| CN | 203630729 U | 6/2014 |
| CN | 104679233 A | 6/2015 |
| CN | 105144052 A | 12/2015 |
| CN | 106133650 A | 11/2016 |
| CN | 206339935 U | 7/2017 |
| DE | 214030 B1 | 12/1986 |
| EP | 1686776 A1 | 8/2006 |
| EP | 2743798 A1 | 6/2014 |
| JP | 2000-163031 A | 6/2000 |
| JP | 2002-342033 A | 11/2002 |
| JP | 2004-129120 A | 4/2004 |
| JP | 2004-236202 A | 8/2004 |
| JP | 2010-537279 A | 12/2010 |
| JP | 2010-540320 A | 12/2010 |
| KR | 10-2005-0033909 A | 4/2005 |
| KR | 10-2010-1016208 B1 | 2/2011 |
| TW | 201035805 A | 10/2010 |
| WO | 2002/073587 A1 | 9/2002 |
| WO | 2006/091494 A1 | 8/2006 |
| WO | 2007/049253 A2 | 5/2007 |
| WO | 2007/114631 A2 | 10/2007 |
| WO | 2009/038862 A1 | 3/2009 |
| WO | 2010/129892 A2 | 11/2010 |
| WO | 2013/169303 A1 | 11/2013 |
| WO | 2014/066516 A1 | 5/2014 |
| WO | 2016/091944 A1 | 6/2016 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(56) References Cited

OTHER PUBLICATIONS

Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action received for U.S. Appl. No. 15/445,383, dated Feb. 25, 2019, 10 pages.
Hasser et al., "Preliminary Evaluation of a Shape-Memory Alloy Tactile Feedback Display, Advances in Robotics, Mechantronics, and Haptic Interfaces", DSC-vol. 49, 1993, pp. 73-80.
Hill et al., "Real-time Estimation of Human Impedance for Haptic Interfaces", IEEE, WHC '09 Proceedings of the World Haptics 2009—Third Joint EuroHaptics conference and Symposium on Haptic Interfaces for Virtual Environment and Teleoperator Systems, Sep. 30, 2009, pp. 440-445.
Lee et al., "Haptic Pen: A Tactile Feedback Stylus for Touch Screens", Mitsubishi Electric Research Laboratories, Oct. 2004, 5 pages.
MrSirLRD, "3D Printed Mini Haptic Actuator", Autodesk, Inc., Accessed online at: <https://www.instructables.com/id/3D-Printed-Mini-Haptic-Actuator/>, Accessed on Dec. 10, 2019, 8 pages.
Non-Final Office Action received for U.S. Appl. No. 15/445,383, dated Jun. 29, 2018, 14 pages.
Notice of Allowance received for U.S. Appl. No. 15/445,383, dated May 31, 2019, 10 pages.
Stein et al., "A Process Chain for Integrating Piezoelectric Transducers into Aluminium Die castings to Generate Smart Lightweight Structures", Results in Physics, vol. 7, 2017, pp. 2534-2539.
Supplemental Notice of Allowance received for U.S. Appl. No. 15/445,383, dated Aug. 21, 2019, 3 pages.

\* cited by examiner

INPUT DEVICE WITH HAPTIC FEEDBACK

FIELD

This relates generally to input devices and, more specifically, to a system including an input device providing haptic feedback.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Styli are often used as input devices for touch-sensitive devices instead of fingers. However, styli provide users with limited or no tactile feedback.

SUMMARY

This relates to haptic feedback provided to a user via an input device. It can be beneficial to provide haptic or tactile feedback to a user to give the user a richer interaction experience with the input device (e.g., a stylus) and host device (e.g., a computing device, track pad or other surface). The input device can include a magnet and a host device can include an array of inductive coils. The inductive coils can be driven to generate a magnetic field (or one or more magnetic fields) that can exert a force on the input device to provide haptic feedback. In some examples, the haptic feedback can be a push force pushing the input device away from the device or a pull force pulling the input device toward the device. In some examples, the haptic feedback can guide the input device (e.g., with a lateral force). The haptic feedback described herein can be used for writing, drawing or actuating virtual input controls (e.g., buttons, sliders, keys, etc.) in the user interface.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to haptic feedback provided to a user via an input device. It can be beneficial to provide haptic or tactile feedback to a user to give the user a richer interaction experience with the input device (e.g., a stylus) and host device (e.g., a computing device, track pad or other surface). The input device can include a magnet and a host device can include an array of inductive coils. The inductive coils can be driven to generate a magnetic field (or one or more magnetic fields) that can exert a force on the input device to provide haptic feedback. In some examples, the haptic feedback can be a push force pushing the input device away from the device or a pull force pulling the input device toward the device. In some examples, the haptic feedback can guide the input device (e.g., with a lateral force). The haptic feedback described herein can be used for writing, drawing or actuating virtual input controls (e.g., buttons, sliders, keys, etc.) in the user interface.

Figure 1A:
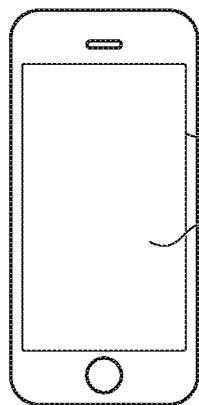
FIGS. 1A-1E illustrate examples of systems with touch screens that can accept input from an input device, such as a stylus, and/or provide haptic feedback to the user via the input device, according to examples of the disclosure.
Figure 1B:
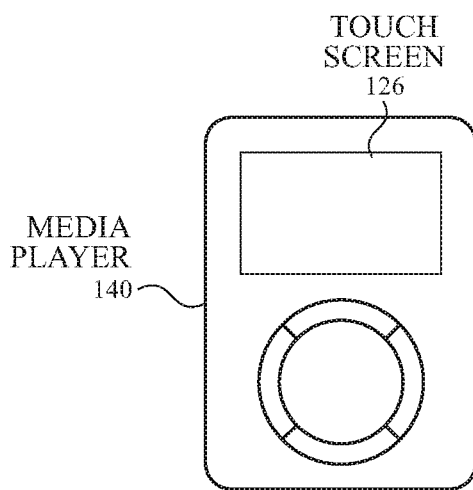
Figure 1C:
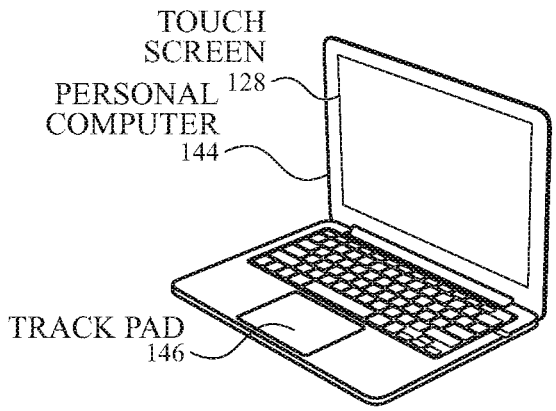
Figure 1D:
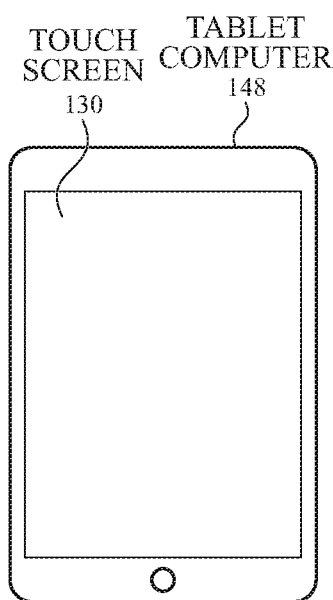
Figure 1E:
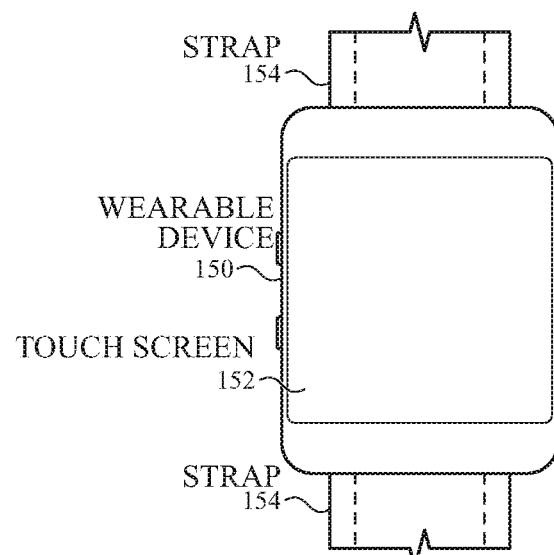

FIGS. 1A-1E illustrate examples of systems with touch screens that can accept input from an input device 100, such as a stylus, and/or provide haptic feedback to the user via the input device, according to examples of the disclosure. FIG. 1A illustrates an exemplary mobile telephone 136 that includes a touch screen 124 that can accept input from an input device, such as a stylus, via a touch-sensitive surface (e.g., touch screen 124) and/or can provide haptic feedback to the user via the input device according to examples of the disclosure. FIG. 1B illustrates an example digital media player 140 that includes a touch screen 126 that can accept input from an input device, such as a stylus, via a touch-sensitive surface (e.g., touch screen 126) and/or can provide haptic feedback to the user via the input device according to examples of the disclosure. FIG. 1C illustrates an example personal computer 144 that includes a touch screen 128 and a track pad 146 that can accept input from an input device, such as a stylus, via a touch-sensitive surface (e.g., touch screen 128, track pad 146) and/or can provide haptic feedback to the user via the input device according to examples of the disclosure. FIG. 1D illustrates an example tablet computing device 148 that includes a touch screen 130 that can accept input from an input device, such as a stylus, via a touch-sensitive surface (e.g., touch screen 130) and/or can provide haptic feedback to the user via the input device according to examples of the disclosure. FIG. 1E illustrates an example wearable device 150 (e.g., a watch) that includes a touch screen 152 that can accept input from an input device, such as a stylus, via a touch-sensitive surface (e.g., touch screen 152) and/or can provide haptic feedback to the user via the input device according to examples of the disclosure. Wearable device 150 can be coupled to a user via strap 154 or any other suitable fastener. It should be understood that the example devices illustrated in FIGS. 1A-1E are provided by way of example, and other devices can accept input from an input device, such as a stylus, via a touch-sensitive surface and/or can provide haptic feedback to the user via the input device according to examples of the disclosure according to examples of the disclosure. Additionally, although the devices illustrated in FIGS. 1A-1E include touch screens, in some examples, the devices may provide haptic feedback without a touch screen (e.g., on the bezel, periphery or backside of a touch screen device or non-touch sensitive display). As described in more detail below, input device 100 can include a magnet and the exemplary host computing device (e.g., mobile telephone 136, digital media player 140, personal computer 144, tablet computing device 148, wearable device 150) can include one or more coils (e.g., an array of coils) which can be driven in order to provide haptic feedback to a user via the input device.

Touch screens 124, 126, 128, 130 and 152 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
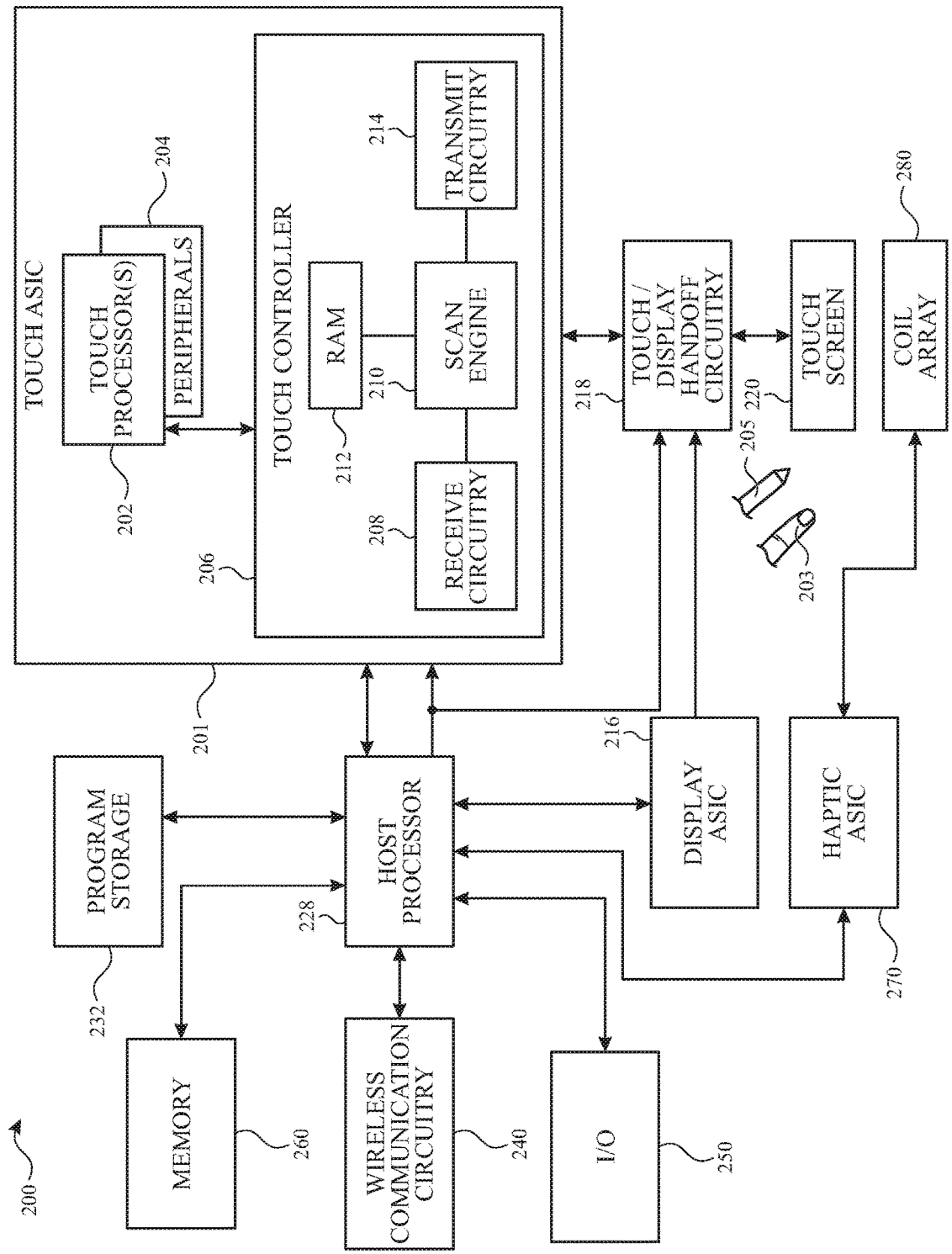
FIG. 2 illustrates a block diagram of an example computing system that can accept input from an input device, such as a stylus, and/or provide haptic feedback to the user via the input device, according to examples of the disclosure.

FIG. 2 illustrates a block diagram of an example computing system 200 that can receive input from an input device, such as an active stylus, according to examples of the disclosure. Computing system 200 could be included in, for example, mobile telephone 136, digital media player 140, personal computer 144, tablet computing device 148, wearable device 150, or any mobile or non-mobile computing device that includes a display. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations for touch screen 220. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a display pixel clock that can indicate transmission of a display pixel. The data signals can include color signals (e.g., red, green, blue). The display ASIC 216 can control the touch screen 220 in real-time, providing the data indicating the display pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD (or LED/OLED) interface, a plasma interface, or any other suitable interface.

In some examples, a handoff circuitry 218 can also be included in computing system 200. Handoff circuitry 218 can be coupled to the touch ASIC 201, display ASIC 216, and touch screen 220, and can be configured to interface the touch ASIC 201 and display ASIC 216 with touch screen 220. The handoff circuitry 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff circuitry 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include one or more coils and a controller to drive and/or sense currents in the coils. For example, FIG. 2 illustrates coil array 280 coupled to a haptic ASIC 270. Haptic ASIC 270 can include a coil controller configured to drive the coils with a current to induce a magnetic feed to cause haptic feedback via the input device. The coil controller in haptic ASIC 270 can, in some examples, include circuitry for sensing currents induced within the coil (e.g., due to motion of an input device including a magnet). In some examples, each of the coils in coil array 280 can be individually controlled. The coil controller in haptic ASIC 270 can selectively provide one or more of the coil with a driving current (or voltage). The coil controller can control the direction of the current, the magnitude of the current, and/or the frequency of the current. The direction of the current (e.g., clock-wise or counter clock-wise) can determine whether the magnetic field induced by the current pulls or pushes the magnet in the input device. The magnitude of the current can determine the intensity of the magnetic field and thereby the intensity of the haptic feedback experienced by the user (e.g., stronger or weaker force). The frequency of the current can also change how the haptic feedback is perceived by the user. For example, a direct current (DC) can result in a constant, unidirectional force whose direction can be easily distinguished by human hands. In some examples, an alternating current (AC) can be used. Low frequency AC (frequency below a threshold) may provide a push or pull directionality that can be perceived by the user. As frequency increases (e.g., above the threshold), the AC may provide haptic feedback without a distinguishable directionality (e.g., a vibrating or buzzing sensation). In some examples, the AC current can be applied with a periodic signal (e.g., sine wave, square wave, triangle wave, saw-tooth wave, etc.). The coil controller can also drive coils in the coil array 280 such that a magnetic field gradient can be created by two or more coils. Magnetic field gradients can be used to guide the input device as described in more detail herein. In some examples, the currents driven to a coil or coils can be static. In some examples, the currents driven to a coil can be dynamic. For example, the currents can be driven to one or more coils in a sequence or pattern to guide the input device dynamically.

In some examples, coil array 280 and touch screen 220 can partially or fully overlap. In some examples, coil array 280 and touch screen 220 can have the same dimension in the X-Y plane and coil array 280 can be disposed beneath touch screen 220 (e.g., so as not to obstruct the display of the touch screen). In some examples, coil array 280 can extend beyond the dimensions of touch screen 220 (e.g., into the bezel of the device). In some examples, coil array 280 can have dimensions smaller than touch screen 220 (e.g., disposed in the border region, center region, or some other region of touch screen 220). It should be understood the coil array 280 can be incorporated in various portion of the device at which haptic feedback to the user is desired whether the portion of the device corresponds to the touch screen or not.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As described herein, host processor 228 can also perform additional functions that may not be related to touch processing. For example, host processor 228 can also be connected to haptic ASIC 270 to drive coil array 280 to provide haptic feedback and/or to sense coil array 280 to detect motion of the input device. In some examples, the driving of coil array 280 can be dependent on the image on the touch screen (e.g., the UI) and/or the position of the input device.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, a processor in haptic ASIC 270, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201, handoff circuitry 218, and haptic ASIC 270 to properly perform sensing, display, and haptic functions for an in-cell touch screen. The synchronization signals can be communicated directly from the host processor 228 to one or more of the display ASIC 216, touch ASIC 201, handoff circuitry 218 and haptic ASIC 270. Alternatively, the synchronization signals can be communicated indirectly (e.g., touch ASIC 201 or handoff circuitry 218 can receive the synchronization signals via the display ASIC 216).

Computing system 200 can also include wireless communication circuitry 240. The wireless communication circuitry 240 can implement a wireless communication standard such as a WiFi®, BLUETOOTH™ or the like. The wireless communication circuitry 240 can be coupled to host processor 228 (as illustrated) and/or the touch ASIC 201. The touch ASIC 201 and/or host processor 228 can, for example, transmit scan plan information, timing information, and/or frequency information to the wireless communication circuitry 240 to enable the wireless module to transmit the information to an active stylus, for example (i.e., a stylus capable generating and injecting a stimulation signal into a touch sensor panel). For example, the computing system 200 can transmit frequency information indicative of one or more low noise frequencies that the stylus can use to generate stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless communication circuitry 240 can also receive information from peripheral input devices, such as an active stylus 205, which can be transmitted to the touch ASIC 201 and/or host processor 228. In other examples, the wireless communication functionality can be incorporated in other components of computing system 200, rather than in a dedicated circuit.

Note that one or more of the functions described herein can be performed by firmware stored in memory and executed by the touch processor in touch ASIC 201, a processor in display ASIC 216 or haptic ASIC 270, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
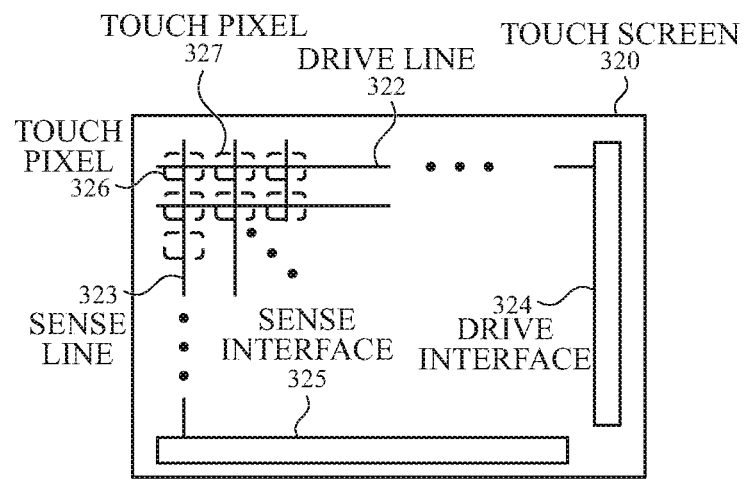
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit circuitry 214 through a drive interface 324, and resulting sense signals generated in sense lines 323 can be transmitted through a sense interface 325 to sense channels of receive circuitry 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
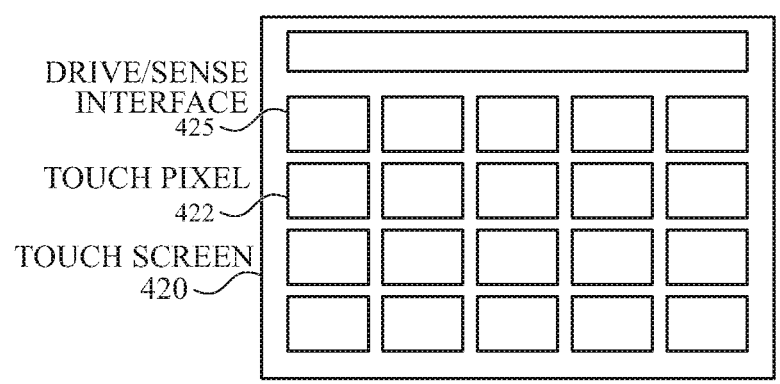
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

In some examples, the input device can be an active stylus. During an active stylus scan, one or more stimulation signals can be injected by the active stylus proximate to one or more touch electrodes (touch nodes) of the touch screen. The stimulation signals injected by the active stylus can create capacitive coupling between the stylus and the touch nodes. The capacitive coupling between the stylus and the one or more touch nodes can vary based on the proximity of stylus to the one or more touch nodes. During the active stylus scan, the transmit circuitry 214 can be disabled, i.e., no stimulation signals Vstim from the touch controller are sent to the touch sensor panel. The capacitive coupling can be measured by the receive circuitry 208 from the one or more touch nodes for processing. In some examples the one or more stylus stimulation signals can have one or more frequencies. The one or more frequencies can be selected by the touch ASIC 201 using information from a stylus spectral analysis scan. This frequency information can be wirelessly communicated to the stylus so that the stylus can generate stimulation signals at the appropriate frequencies. In some examples, one or more multiplexers (or other switching circuitry) can be used to couple touch electrodes to the receive circuitry and/or transmit circuitry. For example, during a mutual capacitance touch sensing scan, row traces can be coupled to the transmit circuitry and column traces can be coupled to the receive circuitry. During an active stylus sensing scan, column traces (or row traces) can be coupled via the one or more multiplexers to the receive circuitry to detect input from the active stylus along one axis of the touch screen, and then the row traces (or column traces) can be coupled via the one or more multiplexers to the receive circuitry to detect input from the active stylus. In some examples, the row and column traces can be sensed simultaneously (i.e., both row and column traces concurrently coupled to the receive circuitry). In some examples, the stylus can be detected on the column traces concurrently with the mutual capacitance scan touch sensing scan. The touch and stylus signals can be differentiated by filtering and demodulating the received response signals at different frequencies.

Figure 5A:
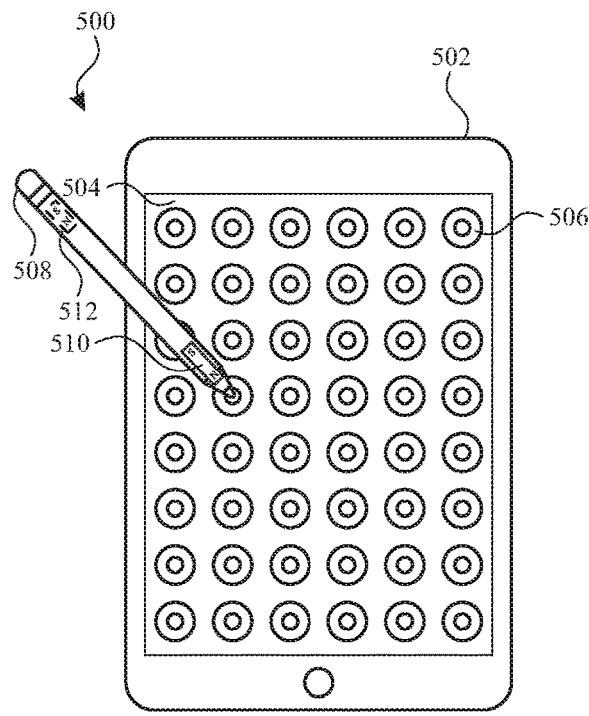
FIGS. 5A-5B illustrate an exemplary input device including one or more magnets and host device including an array of coils according to examples of the disclosure.
Figure 5B:
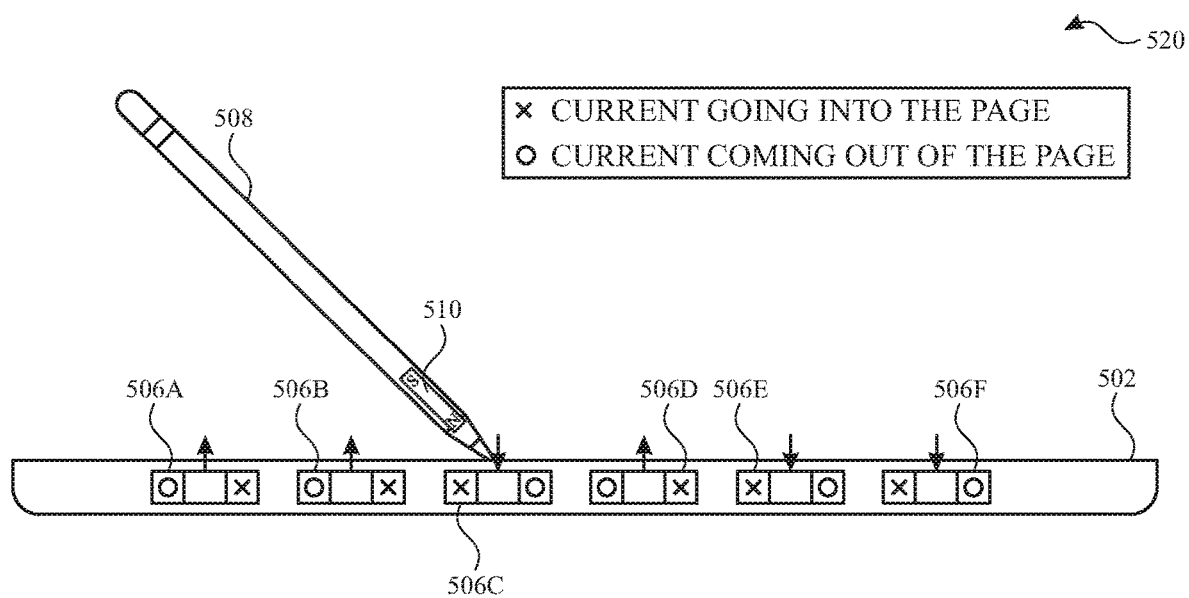

As described herein, haptic feedback can be provided to a user via an input device. For example a permanent magnet inside an input device (e.g., a stylus) can enable haptic feedback to the user by interaction with magnetic fields generated by an array of coils in a host device. The magnetic fields can create push or pull forces experienced by the user and/or can guide the input device. FIGS. 5A-5B illustrate an exemplary input device including one or more magnets and host device including an array of coils according to examples of the disclosure.

FIG. 5A illustrates a top down view of a system 500 including a host device 502 including an array of coils 504 and an input device (e.g., stylus 508) according to examples of the disclosure. Array of coils 504 can be disposed within a housing of device 502 (e.g., beneath a touch screen), but for ease of illustration, array of coils 504 internal to device 502 is shown in rather than the touch screen. Stylus 508 can include one or more permanent magnets (e.g., composite magnets, rare earth magnets, etc.). For example, stylus 508 can include a permanent magnet 510 proximate to the tip of stylus 508. Placement of magnet 510 near the tip of stylus 508 can improve the inductive coupling between magnet 510 and coils 506 in the array of coils 504 (as the magnetic field can be a function of the distance between the magnet and the coils). In some examples, magnet 510 can be a bar magnet oriented parallel to the axis of the stylus such that the north pole is more proximate to the distal end of the stylus (the tip) than the south pole (i.e., magnetized along the longitudinal direction of stylus 508). In some examples, the orientation of the poles can be reversed. In some examples, stylus 508 can include more than one magnet. For example, a second permanent magnet 512 can be included at the proximal end of stylus 508. In some examples, the orientation of the poles of magnet 512 can be the same as magnet 510. For example, as illustrated in FIG. 5A, magnet 512 can be oriented parallel to the axis of the stylus such that the north pole is more proximate to the distal end of the stylus (the tip) than the south pole (i.e., the south pole is more proximate to the proximal end of the stylus). In such examples, when the proximal end of the stylus rather than the distal end of the stylus is proximate to the coil array 508, the direction of haptic feedback can be reversed for the same applied currents. Thus, the haptic feedback can provide an indication to the user of which end of the stylus is contacting the surface. Additionally, induced currents on the coil can have a polarity that can indicate to the haptic controller of which end of the stylus is contacting the surface. In some examples, the input behavior can be different depending on which end of the stylus is contacting or proximate to the touch screen. For example, the distal end can correspond to an "inking" input and the proximal end can correspond to an "erasing" input. In some examples, the orientation of the poles of magnet 512 can be the opposite of the orientation of the poles of magnet 510, such that the haptic feedback can appear in the same direction irrespective of which end of the stylus is used.

Stylus 508 can be used with a host device 502 (e.g., mobile telephone 136, digital media player 140, personal computer 144, tablet computing device 148, wearable device 150), that can include coil array 504 including multiple electromagnetic coils 506. In some examples, coil array 504 can include coils 506 evenly distributed across the touch screen of the host device 502. For example, a tablet computing device can be equipped with a 10×20 array of electric coils. In some examples, the coil array 504 can be disposed underneath the touch screen to avoid obstructing the display. The coils in the array of coils 504 can be oriented such that the magnetic field produced by each coil can be perpendicular to the surface of the touch screen. The magnetic field produced by coils 506 can penetrate through the touch screen. Additionally, the magnetic field produced by coils 506 can penetrate through other non-ferromagnetic panels (e.g., glass, non-ferromagnetic metals such as aluminum, etc.), such that the magnetic field produced by coils 506 in coil array 504 can penetrate through the surface of host device 502 opposite the touch screen or a non-display surface (e.g., a trackpad). The magnetic field penetrating through both surfaces can enable the haptic feedback for an input device on one or both sides of the device.

Coils 506 can include a specified number of turns (e.g., 10-50 turns). The number of turn can be a design tradeoff between magnetic field and device dimensions. For example, increasing the number of turns can increase the magnetic field and decreasing the number of turns can decrease the magnetic field. Increasing the number of turns can increase the thickness of the coils (and thereby the thickness of the host device) and decreasing the number of turns can decrease the thickness of the coils (and thereby avoid or minimize increasing the thickness of the host device). Coil 506 can therefore be designed with sufficient turns to generate sufficient magnetic field for haptic feedback while meeting the space constraints for the host device.

The direction and magnitude of the current on each coil can be independently controlled to generate the magnetic field(s) (e.g., by the controller in haptic ASIC 570). The current can be supplied, for example, by a current source or a voltage source in haptic ASIC 570. The current passing through the coils can create magnetic fields. The magnetic polarity of the field lines generated in coils 506 can be dependent on the direction of current flow through each coil. The controller can cause an electric current to flow through one coil 506 at a time, or multiple coils simultaneously in the same or different directions. In some examples, the direction of current flow, and hence the polarity of the magnetic field, can be individually controlled for each coil 506. In some examples, the drive scheme can be implemented as a pre-determined sequence of drive signals, which can in turn provide a pre-determined sequence of magnetic fields for guiding a stylus. Utilizing any of the above techniques, the controller can be configured to generate interactions between the magnetic fields generated in the coils 506 and the magnet(s) 510, 512 in stylus 508 that result in haptic feedback to a user.

A linear relationship can exist between the magnetic field and the number of turns (e.g., layers) in a coil 506. An additional factor that can affect the strength of the magnetic field can be the power applied to the coil via a source (e.g., current source, voltage source). For example, modeling a coil as a small magnet with its magnetic field and direction tuned by the current flowing through the coil, the magnetic field generated by the coil on its Z-axis can be computed using the following equation:

$$B_z = -\frac{\mu_0}{4\pi} \frac{2\pi R^2 I}{(z^2 + R^2)^{\frac{3}{2}}}$$

where $\mu_0$ to can represent the permeability, R can represent the radius of the coil, I can represent the magnitude of electric current, and z can represent the distance from the origin of the circular coil.

Examples of the disclosure are not limited to each coil generating the same magnetic field strength. Different magnetic field strengths and magnetic field gradients can be created by configuring the coils differently and/or by applying different biases to the coils. The targeted magnetic field strength can be based on the material between coil array 504 and the surface (e.g., touch screen, glass, aluminum). In some examples, coils 506 can include a ferromagnetic material (not shown) in the core to enhance the magnetic field. In some examples, shielding layer(s) can be included to control the size and/or shape magnetic fields, to prevent interference from external sources, or both.

FIG. 5B illustrates a cross-sectional view of system 520 including stylus 508 and host device 502 including an array of coils 504 according to examples of the disclosure. The cross-sectional view shows one row of coils including coils 506A-506F. Each coil can be driven independently with a current and generate a corresponding magnetic field. For example, coils 506A, 506B and 506D be driven with counter-clockwise currents and generate magnetic fields (indicated by arrows) oriented upward to the surface of host device 502, and coils 506C, 506E and 506F can be driven with clockwise currents and generate magnetic fields (indicated by arrows) oriented downward toward the surface of host device 502. The magnetic fields generated by coils 506A-506F can interact with magnet 510 in stylus 508 to cause push or pull forces. For example, with the magnetic orientation shown in FIG. 5B, a pull force toward the panel can be generated by coils 506C, 506E and 506F and a push force can be generated by coils 506A, 506B and 506D. Thus, the haptic feedback can be provided to user as push and/or pull forces.

Figure 6:
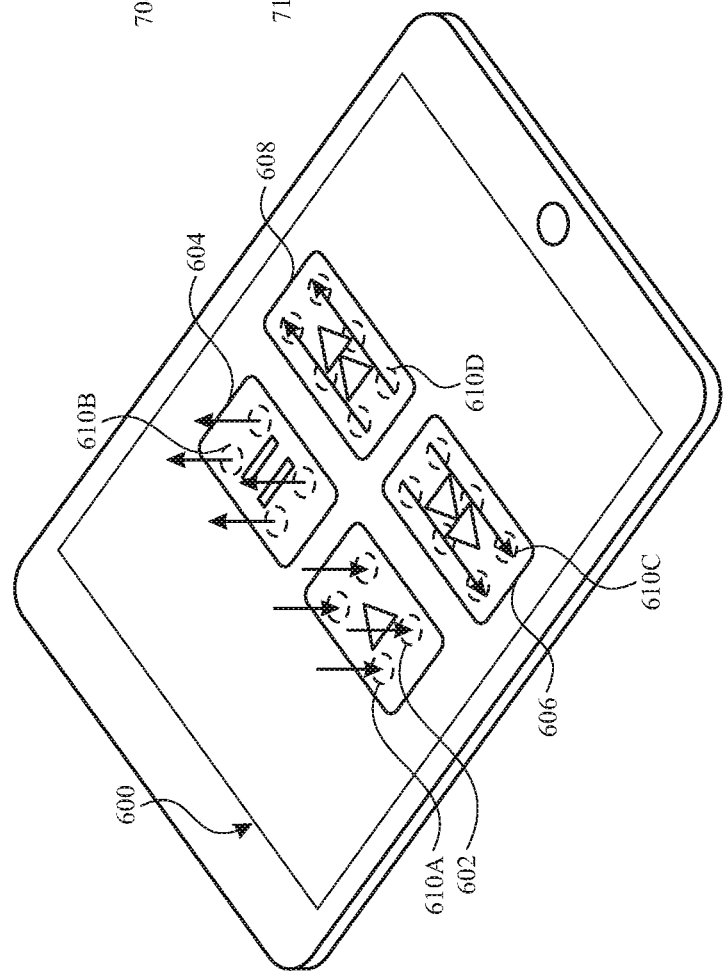
FIG. 6 illustrates an example of haptic feedback based on a user interface on the display according to examples of the disclosure.

In some examples, the coils can be driven based on the user interface on the display. For example, the pull force may be generated over user interface elements (e.g., buttons, sliders, scroll-wheels, etc.) to indicate the presence and/or functionality and/or state of the user interface object. Coils corresponding to other parts of the user interface may remain un-driven. FIG. 6 illustrates an example of haptic feedback based on a user interface on the display according to examples of the disclosure. For example, a user interface could include display of media playback controls in a user interface displayed on touch screen 600. The media playback controls can include a play button 602, a pause button 604, a rewind button 606 and a fast-forward button 608. In some examples, a push or pull force can be generated over the media controls (e.g., over some or all of the play button 602, a pause button 604, a rewind button 606 and a fast-forward button 608s) and not be generated elsewhere on the display. For example, corresponding coils 610A-D corresponding to the media playback control user interface elements can each be driven (e.g., with the same current, or different currents) and the remaining coils corresponding to other regions of the user interface can be un-driven. This haptic feedback (push and/or pull) can indicate to the user where there are user-interactive controls and where there are not user-interactive controls. In some examples (as illustrated in FIG. 6), the play button 602 of the media playback controls can have one direction of force (e.g., a pull force indicated by downward force arrows) and the pause button 604 of the media playback controls can have a different (e.g., opposite) direction of force (e.g., a push force indicated by upward force arrows). In such examples, the direction of the haptic feedback can be indicative of the functionality of the user interface element (or can be used more simply to differentiate between different types of elements). In some examples, a magnetic field gradient can be created or the intensity of the magnetic field adjusted. For example, the media playback controls can include a fast forward button 608 and/or rewind button 606. These buttons can be differentiated by a magnetic field gradient that pulls directionally forward (rightward in the illustration) or backward (leftward in the illustration) to indicate the corresponding functionality of the control. For example, coils 610C corresponding to rewind button 606 can be driven to generate a magnetic field gradient pulling in a reverse (leftward) direction and coils 610D corresponding to fast-forward button 608 can be driven to generate a magnetic field gradient pulling in a forward (rightward) direction. In some instances, the speed of fast-forwarding or rewinding can be reflected in the intensity of the field (or gradient). For example, fast-warding at 2× speed may have a first (e.g., lower) intensity and 4× speed may have a second (e.g., higher) intensity. In order to generate magnetic fields corresponding to the user interface, the system (e.g., host processor 228 or haptic ASIC 270) may drive coils based on the contents of the user interface (e.g., the existence and location of specific user interface elements for which to provide haptic feedback via the coil array), the state of the user interface elements, and/or the location of stylus 508 with respect to the user interface and its elements. For example, the coil array may only be driven while the user interface includes certain user interface elements and only at the location of said user interface elements. For example, the driving parameters for the coils may change based on the state of the user interface elements. For example, the intensity of the driving current may be varied depending on the state of the fast-forward and rewind buttons. In some examples, the pause button and play button intensity or direction of current may change depending on the state of the user interface. For example, while media is playing the pause button may have a pull force (and/or a stronger intensity) and the play button a push force (and/or a weaker intensity), whereas while media is paused the play button may have pull force (and/or a stronger intensity) and the pause button a push force (and/or a weaker intensity). In some examples, while the input device remains further from the user interface elements, the intensity can be increased (or decreased), and while the input device moves closer to the user interface elements, the intensity can be decreased (or increased). Although media playback controls are described as an exemplary user interface including controls, it should be understood that the push force, pull force and/or lateral forces can be implemented for other user interface controls. For example, magnetic fields can be generated for navigation buttons in the user interface (e.g., forward and/or backward buttons in menus, such as in a mail or messaging application). In some examples, the directionality of the magnetic fields can be used to indicate different functionality or the type of functionality of the navigation buttons. For example, the forward navigation button may have a pull force or a rightward lateral force and backward navigation button may have a push force or a leftward lateral force.

Figure 7:
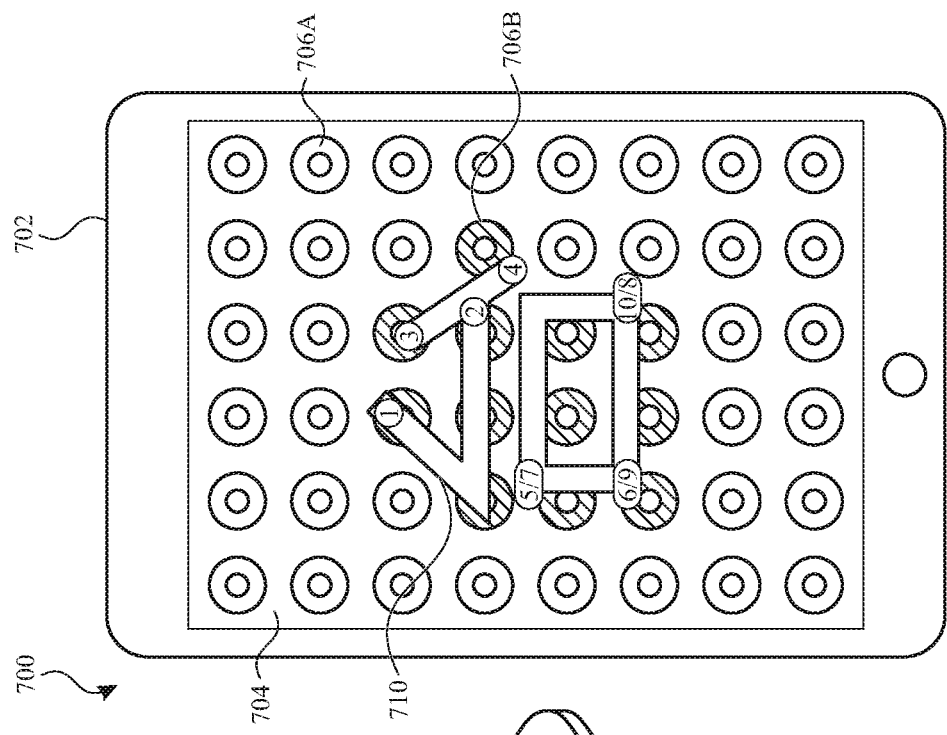
FIG. 7 illustrates an example of haptic feedback to guide an input device according to examples of the disclosure.

As described herein, in some examples the haptic feedback can be provided to guide the input device. For example, coils of the coil array can be turned on or off to generate forces (e.g., gradients) to guide the pen across a touch screen or other surface. For example, guiding an input device can be used for letter formation (e.g., in an educational or non-educational setting). FIG. 7 illustrates an example of haptic feedback to guide an input device according to examples of the disclosure. FIG. 7 illustrates a top down view of a system 700 including a host device 702 including a coil array 704 including coils 706A-706B. Additionally, FIG. 7 illustrates a character 710 (e.g., the first simplified Chinese character in the word "Taiwan") a user may be trying to learn to write. During the learning processes the character may be displayed on the display. Coils of coil array 704 can be driven to guide the pen in forming character 710. For example, coils 706A may remain inactive and coils 706B corresponding to character 710 can be activated to guide the pen through the five strokes to form character 710 (start and end of the strokes indicated numerically from 1-10 in FIG. 7). In some examples, the coils can be activated in a sequence to generate haptic feedback to guide the input device to make the strokes corresponding to character 710. For example, some coils can be driven to create a magnetic field for the first stroke (or a portion of the first stroke) and then once the first stroke (or the portion of the first stroke) is completed (e.g., as determined by touch detection by touch ASIC 201), some coils can be driven to create a magnetic field for the second stroke (or the next portion of the first stroke). In some examples, after the completion of a stroke, the coils can be driven to guide the input device to a location to start the next stroke. For example, once the input device location is detected at the end of the stroke, the coils can be driven to reposition the input device for the next stroke. In some examples, the user can move the input device to the location of the next stroke and the coils can be driven for the next stroke once the position of the input device is detected at the location corresponding to the next stroke. The process can continue for each subsequent stroke in the letter formation. The guidance provided by the input device and coil array 704 can help a user form muscle memory in character formation.

In some examples, the intensity of the magnetic field can change depending on the location of the input device. For example, while forming character 710, a distance between the displayed character 710 and the position of the input device can be tracked (e.g., by the touch screen). When the input device location strays from the character 710 the magnetic field can be intensified to guide the input device back on track. In some examples, the magnetic force can be increased when the input device location exceeds a threshold from the character. In some examples, the magnetic force can be gradually increased such that the intensity is proportional to the distance between the character (e.g., intended location of the input device) and the input device (e.g., actual location of the input device).

Figure 8:
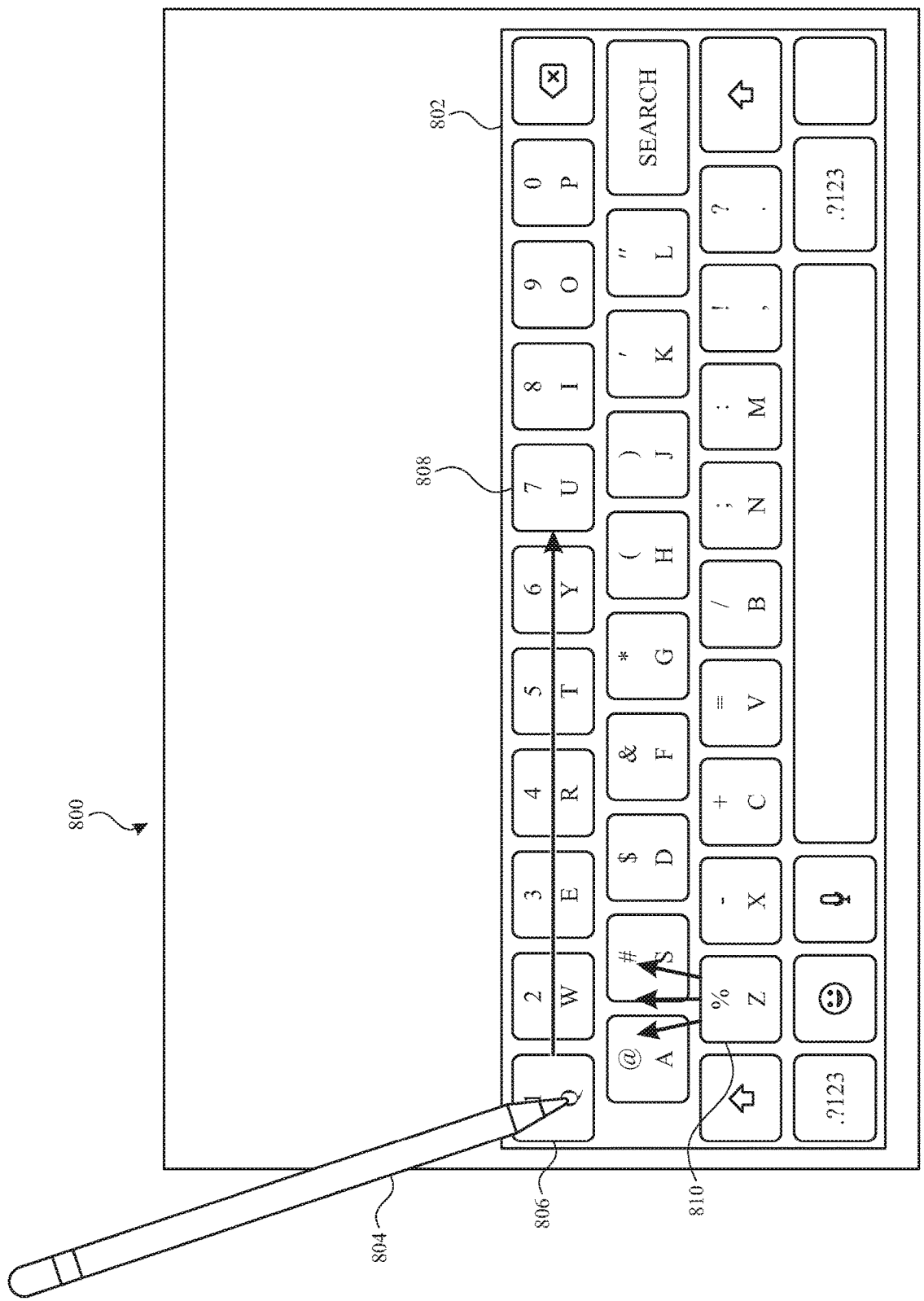
FIG. 8 illustrates an example of haptic feedback based on a user interface including a virtual keyboard according to examples of the disclosure.

Although described above in the context of letter formation, guidance of the input device can be used for other purposes. For example, guidance can be provided to assist a user draw straight lines or other shapes (e.g., circles, ellipses, rectangles, etc.) or pictures or logos, etc. that are displayed (or not displayed) on the touch screen. Additionally or alternatively, guidance of the input device can be used to improve input on a virtual keyboard. FIG. 8 illustrates an example of haptic feedback based on a user interface including a virtual keyboard according to examples of the disclosure. For example, touch screen 800 can include a virtual keyboard 802. While providing input to virtual keyboard 802 using input device 804, for example, the input device can be guided to provide predictive text input. For example, the input device can be pulled toward more commonly used letters in a sequence of letters (e.g., those with high probability of being the intended input) or pushed away from less likely letters (e.g., those with a lower probability of being the intended input). For example, after actuating (with input device 804) virtual Q key 806 to select the letter "q" to begin a word, the input device 804 may be pulled by magnetic fields generated by the coils toward the virtual U key 808 to select the letter "u" (indicated by force arrows) which often follows or away from the virtual Z key 810 to avoid selecting the letter "z" (indicated by force arrows) which never follows the letter "q" in a word (and is therefore unlikely to be the intended input). When multiple options are available, the input device may be forced in the direction of the most likely input or in a direction shared by the multiple options. In some examples, the intensity can be a function of the probability of the next input (and therefore also may be based on the string of input characters or previous locations at which virtual keys are actuated). For example, the intensity may increase if there are fewer valid options and may decrease if there are more valid options. Additionally or alternatively, in some options the location of the input device can be used to change the intensity or other characteristics of the driving signals. For example, moving the input device toward a given character may update the probabilities for the intended input and thereby change which coils are driven and the direction or intensity of the current.

In some examples, the magnetic field can be used to orient the input device on the touch surface or to assist in keeping the input device in a specific region of the touch surface. For example, rather than a sequence of signals (e.g., to guide the pen along a particular path), a static signal can be applied by coils in the coil array static to orient the input device in a specific direction (so that it rests parallel or perpendicular to an axis (x or y) of the touch screen of the corresponding input device). In some examples, a static gradient can be created to prevent or limit the ability of the input device to roll off the surface. For example, when the input device rests on host device, coils in the coil array may be driven to prevent or limit motion of the input device. For example, the magnetic force on either side of the input device can force the input device to remain in place (e.g., creating a parabolic gradient such that the magnetic field increases exponentially moving in either direction away from the resting place of the input device).

As described herein, in some examples, touch detection (e.g., performed by touch ASIC 201) can interplay with the haptic feedback (e.g., provided via haptic ASIC 270). For example, as discussed above with respect to FIG. 7, the sequence of the haptic feedback can be based on location (the sequence of driving coils can be triggered based on the position of the input device) and/or the intensity of haptic feedback can be based on the position of the input device relative to a character. For example, as a user tracing the character strays from the expected path, the appropriate coils can be driven with increased intensity (or with different directions or other properties) in order to guide the user back to the expected path for tracing the character.

Figure 9:
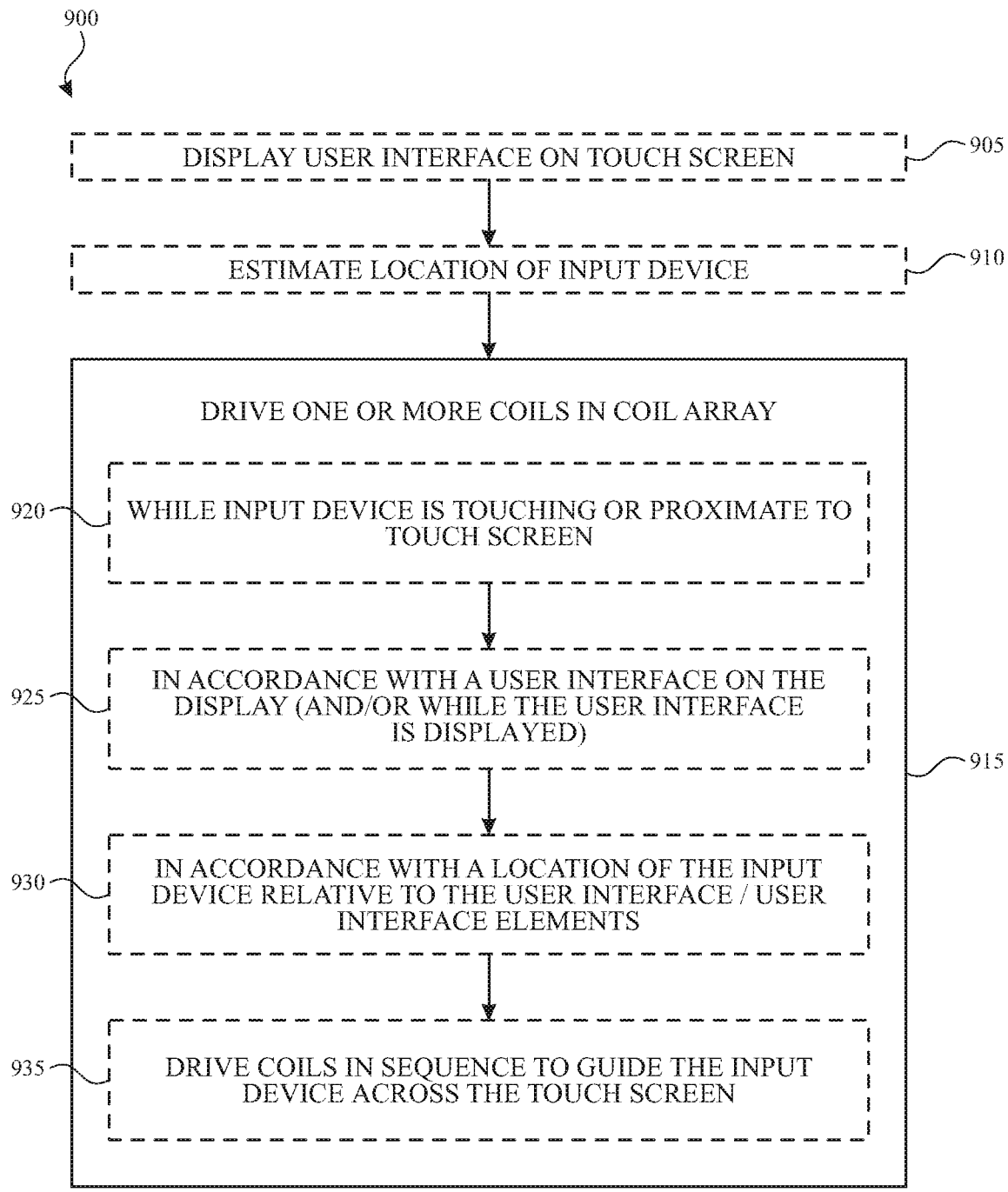
FIG. 9 illustrates an example process for providing haptic feedback according to examples of the disclosure.

FIG. 9 illustrates an example process 900 for providing haptic feedback according to examples of the disclosure. In some examples, at 905, a user interface can be displayed on the touch screen. For example, the user interface can include user interface control elements (e.g., as illustrated in FIG. 6), a character or other image to trace (e.g., as illustrated in FIG. 7) or a virtual keyboard (e.g., as illustrated in FIG. 8). In some examples, at 910, a location of an input device can be estimated. For example, the location of the input device can be estimated based on capacitive measurements by the touch sensing system and touch screen (e.g., as described above with respect to FIGS. 2-4). At 915, one or more coils in a coil array can be driven (and other coils of the coil array may remain un-driven). For example, the coils can be driven by the controller in haptic ASIC 270. The direction and magnitude of the current on each coil can be independently controlled to generate the magnetic field(s). Driving the one or more coils in the array can generate interactions between the magnetic field(s) generated by the coils and the magnet in an input device that can result in haptic feedback to a user (e.g., a normal pull-force, normal push force, or lateral force). In some examples (920), the one or more coils may be driven while the input device is touching (or proximate to within a threshold distance) the touch screen and remain un-driven when the input device is not touching (or outside the threshold distance of) the touch screen. Additionally or alternatively, in some examples (925), the one or more coils may be driven in accordance with the user interface (and while the user interface is displayed on the display). For example, the coils may be driven to provide pull, push or lateral forces when interacting with displayed user interface control elements (e.g., as illustrated in FIG. 6), to guide an input device in tracing a character (e.g., as illustrated in FIG. 7), or to guide an input device in text entry in a virtual keyboard (e.g., as illustrated in FIG. 8). Additionally or alternatively, in some examples (930), the one or more coils may be driven in accordance with the location of the input device relative to the user interface. Additionally or alternatively, in some examples (935), the one or more coils may be driven in a sequence to guide the input device across the touch screen. For example, a sequence of signals can be applied to specified coils to generate a sequence of magnetic fields (or magnetic field gradients) to guide the input device/ user. The sequence of driving coils to guide a user in tracing a character may depend on where the input device is located with respect to the character, for example. As another example, some coils may be driven with increasing intensity as an input device strays from the path of tracing the character.

Figure 10:
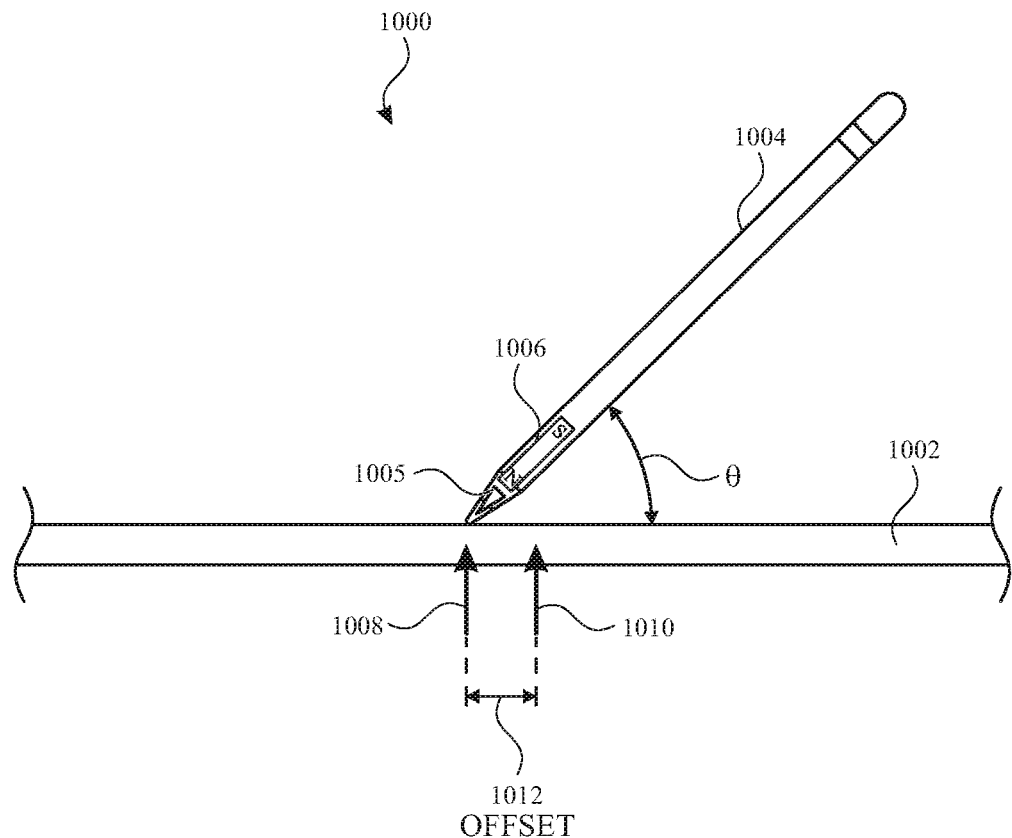
FIG. 10 illustrates an exemplary configuration for measuring input device tilt according to examples of the disclosure.

In some examples, the coil array itself can be used for touch detection or to augment touch detection. For example, a moving stylus 508 including a magnet can induce a current that can be detected in the coils of coil array 504 (e.g., by sensing circuitry in the controller of haptic ASIC 570). The detected currents can be used to determine motion of the input device. These motions could be used in place of or in addition to touch detected of the stylus by the capacitive touch sensing system. In some examples, the detection of touch (during movement) of the input device by the coil array can be compared with the results of touch detection by a capacitive touch sensing system to verify the position detection. In some examples, the currents measured by the coil array can be used along with touch location information from the capacitive touch sensing system to estimate a tilt of the stylus (or verify a tilt of the stylus computed using the capacitive touch sensing system). FIG. 10 illustrates an exemplary configuration 1000 for measuring input device tilt according to examples of the disclosure. For example, a host device 1002 (e.g., a tablet computer) can estimate a first location of the input device 1004 (e.g., via capacitive coupling between the tip electrode 1005 and touch electrodes of the host device 1002). Likewise, the host device 1002 can (simultaneously or within a threshold period of time) estimate a second location of the input device 1004 (e.g., via magnetic coupling between the magnet 1006 and coil array of host device 1002). An offset 1012 can be measured between the first location 1008 of the input device (e.g., indicated by the capacitive touch system) and the second location 1010 of the input device (e.g., indicated by the magnetic field interactions between the magnet and the coil array while the input device is moving). The offset 1012 in position between the first location 1008 and the second location 1010 can be used to estimate the tilt (e.g., angle theta relative to the host device 1002) of the input device (based on the offset distance and the known geometry of the input device's tip electrode(s) 1005 and the magnet 1006).

Figure 11:
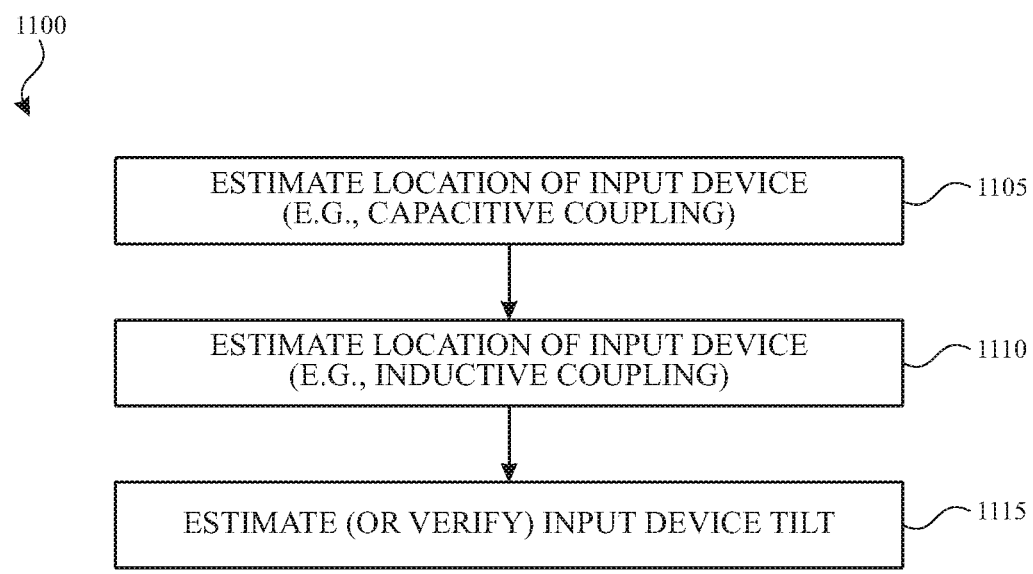
FIG. 11 illustrates an example process for estimating input device tilt according to examples of the disclosure.

FIG. 11 illustrates an example process 1100 for estimating input device tilt according to examples of the disclosure. At 1105, the host device can estimate a first location of the input device (e.g., a stylus). The first location can correspond to the location of the stylus tip, based on capacitive coupling between a stylus tip electrode and touch screen electrodes by the capacitive touch sensing circuitry in the host device (e.g., by touch ASIC 201 and touch screen 220). At 1110, the host device can estimate a second location of the input device. The second location can correspond to the location of the stylus tip, based on inductive/magnetic coupling between a magnet in the stylus by the magnetic circuitry in the host device (e.g., by haptic ASIC 270 and coil array 280). For example, as the input device moves across the surface of the touch screen, currents can be induced in the coil array disposed beneath the touch screen. At 1115, the host device (e.g., host processor 228) can estimate tilt of the input device based on the first and second estimated locations. For example, no offset between the two estimates may indicate that the input device is perpendicular with the host device. The existence of an offset can correspond to a tilt angle that can be computed based on the offset and the geometries of the input device (and its tip electrode and magnet). For example, empirical data measuring offset for different tilt angles can be stored in a look up table and used to estimate the tilt angle based on the offset. In some examples, the input device tilt may be measured by other means (e.g., based on capacitive coupling between a ring electrode and a tip electrode in an active stylus) and the estimated tilt angle based on the first and second locations can be used to verify the tilt angle.

In some examples, the driving of coils for haptic feedback can be time multiplexed with the touch and/or display functionalities. For example, driving the currents in the coils may create transient noise in the touch and/or display systems. To reduce or eliminate interference, the coils can be driven during a period of time when the touch system is not scanning and/or the display system is not refreshing.

Additionally, in some examples, to reduce power consumption, the coils can be driven to provide haptic feedback only when the input device is contacting the touch screen (or within a threshold distance from the touch screen) and/or only when the haptic feedback may be meaningful to the user (e.g., when user interface controls are displayed or while learning to draw a character). In some examples, the duty cycle for driving the coils can be reduced from 100% to reduce power consumption.

As described herein, the input device can include the permanent magnet and the host device can include the coil array. It should be understood that other configurations can be possible. For example, the permanent magnet(s) in the input device can be replaced with coils that can be driven as electromagnets to produce similar haptic feedback. Using a coil rather than a permanent magnet, however, may require additional circuitry in the input device and consume additional power. Additionally, permanent magnets can be used within the host device to create haptic feedback. For example, a permanent magnet in the host device can provide a reference point for a user of an input device with a permanent magnet (or an electromagnet). The selectively drivable coil array, however, can provide more flexibility for haptic feedback in the host device.

Although primarily described as a stylus herein, the input device including the magnet can be a different type of input device. For example, the magnet can be included in an input device augmenting a finger or other body part. For example, the magnet can be incorporated into a glove or ring worn by a user, or the magnet can be fastened to a user's finger (e.g., with a strap or other fastener).

Therefore, according to the above, some examples of the disclosure are directed to an electronic device. The electronic device can comprise a touch screen, an array of coils disposed beneath the touch screen, and processing circuitry. The processing circuitry can be capable of driving one or more coils in the array of coils with one or more signals to generate one or more magnetic fields, the one or more magnetic fields exerting a force on an input device touching or proximate to the touch screen. Additionally or alternatively to one or more of the examples disclosed above, in some examples, driving the one or more coils with the one or more signals to generate the one or more magnetic fields can comprise driving a plurality of coils in the array of coils with a plurality of signals having different magnitudes to generate a magnetic field gradient, the magnetic field gradient exerting a lateral force on the input device. Additionally or alternatively to one or more of the examples disclosed above, in some examples, the force can comprise a pull force on the input device or a push force on the input device. Additionally or alternatively to one or more of the examples disclosed above, in some examples, driving the one or more coils with the one or more signals to generate the one or more magnetic fields can comprise driving a first coil of the array of coils with a first current having a first amplitude and concurrently driving a second coil of the array of coils with a second current having a second amplitude different from the first amplitude. Additionally or alternatively to one or more of the examples disclosed above, in some examples, driving the one or more coils with the one or more signals to generate one or more magnetic fields can comprise driving a first coil of the array of coils with a first current having a first amplitude and forgoing driving a second coil of the array of coils. Additionally or alternatively to one or more of the examples disclosed above, in some examples, driving the one or more coils with the one or more signals to generate the one or more magnetic fields can comprise driving a first coil of the array of coils with a first current having a first frequency and concurrently driving a second coil of the array of coils with a second current having a second frequency different from the first frequency. Additionally or alternatively to one or more of the examples disclosed above, in some examples, driving the one or more coils with the one or more signals can comprise driving a plurality of coils in a sequence to guide the input device. Additionally or alternatively to one or more of the examples disclosed above, in some examples, the processing circuitry can be further capable of displaying a user interface on the touch screen. Driving the one or more coils in the array of coils can comprise driving the one or more coils corresponding to one or more user interface elements in the user interface displayed on the touch screen. Additionally or alternatively to one or more of the examples disclosed above, in some examples, the user interface can include a character and driving the one or more coils corresponding to the user interface can comprise driving a plurality of coils corresponding to the character to guide the input device to trace the character. Additionally or alternatively to one or more of the examples disclosed above, in some examples, the user interface can comprise a user interface control including one or more buttons and driving the one or more coils corresponding to the user interface can comprise driving coils corresponding to the one or more buttons to exert a push or pull force on the input device. Additionally or alternatively to one or more of the examples disclosed above, in some examples, the user interface control can comprise a first button and a second button, one or more first coils corresponding to the first button can be driven to exert a push force on the input device, and one or more second coils corresponding to the second button can be driven to exert a pull force on the input device. Additionally or alternatively to one or more of the examples disclosed above, in some examples, the user interface can comprise a virtual keyboard including one or more virtual keys and driving the one or more coils corresponding to the user interface can comprise predicting a next virtual key and driving coils to guide the input device to the predicted next virtual key. Additionally or alternatively to one or more of the examples disclosed above, in some examples, an intensity of the one or more signals driving the one or more coils can correspond to a distance between the input device and a user interface element in the user interface. Additionally or alternatively to one or more of the examples disclosed above, in some examples, the one or more coils in the array of coils can be driven only while the user interface is displayed on the touch screen. Additionally or alternatively to one or more of the examples disclosed above, in some examples, the processing circuitry can be further capable of: measuring capacitive coupling between the input device and the touch screen, and estimating a location of the input device based on the capacitive coupling between the input device and the touch screen measured by the touch screen. The one or more coils in the array of coils can be driven only while the input device is touching the touch screen or within a threshold distance of the touch screen. Additionally or alternatively to one or more of the examples disclosed above, in some examples, the processing circuitry can be further capable of: measuring one or more induced currents in the array of coils in response to movement of the input device over the touch screen, and estimating a location of the input device based on the one or more induced currents measured in the array of coils. Additionally or alternatively to one or more of the examples disclosed above, in some examples, the processing circuitry can be further capable of: measuring capacitive coupling between the input device and the touch screen, estimating a location of the input device based on the capacitive coupling between the input device and the touch screen measured by the touch screen, and estimating a tilt of the input device based on the location of the input device estimated based on the one or more induced currents measured in the array of coils and based on the location of the input device estimated based on the capacitive coupling.

Some examples of the disclosure are directed to a method. The method can comprise driving one or more coils in an array of coils with one or more signals to generate one or more magnetic fields, the one or more magnetic fields exerting a force on an input device touching or proximate to a touch screen. Additionally or alternatively to one or more of the examples disclosed above, in some examples, driving the one or more coils with the one or more signals to generate the one or more magnetic fields can comprise driving a plurality of coils in the array of coils with a plurality of signals having different magnitudes to generate a magnetic field gradient, the magnetic field gradient exerting a lateral force on the input device. Additionally or alternatively to one or more of the examples disclosed above, in some examples, the force can comprise a normal pull force on the input device, a normal push force on the input device, or a lateral force to guide the input device across the touch screen. Additionally or alternatively to one or more of the examples disclosed above, in some examples, driving the one or more coils with the one or more signals to generate the one or more magnetic fields can comprise driving a first coil of the array of coils with a first current having a first amplitude and concurrently driving a second coil of the array of coils with a second current having a second amplitude different from the first amplitude. Additionally or alternatively to one or more of the examples disclosed above, in some examples, driving the one or more coils with the one or more signals to generate the one or more magnetic fields can comprise driving a first coil of the array of coils with a first current having a first amplitude and forgoing driving a second coil of the array of coils. Additionally or alternatively to one or more of the examples disclosed above, in some examples, driving the one or more coils with the one or more signals to generate the one or more magnetic fields can comprise driving a first coil of the array of coils with a first current having a first frequency and concurrently driving a second coil of the array of coils with a second current having a second frequency different from the first frequency. Additionally or alternatively to one or more of the examples disclosed above, in some examples, driving the one or more coils with the one or more signals can comprise driving a plurality of coils in a sequence to guide the input device. Additionally or alternatively to one or more of the examples disclosed above, in some examples, the method can further comprise displaying a user interface on the touch screen. Driving the one or more coils with the one or more signals can comprise driving the one or more coils corresponding to one or more user interface elements in the user interface displayed on the touch screen. Additionally or alternatively to one or more of the examples disclosed above, in some examples, the user interface can include a character and driving the one or more coils corresponding to the user interface can comprise driving a plurality of coils corresponding to the character to guide the input device to trace the character. Additionally or alternatively to one or more of the examples disclosed above, in some examples, the user interface can comprise a user interface control including one or more buttons and driving the one or more coils corresponding to the user interface can comprise driving coils corresponding to the one or more buttons to exert a push or pull force on the input device. Additionally or alternatively to one or more of the examples disclosed above, in some examples, the user interface control can comprise a first button and a second button. One or more first coils corresponding to the first button can be driven to exert a push force on the input device and one or more second coils corresponding to the second button can be driven to create a pull force on the input device. Additionally or alternatively to one or more of the examples disclosed above, in some examples, the user interface can comprise a virtual keyboard including one or more virtual keys. Driving the one or more coils corresponding to the user interface can comprise predicting a next virtual key and driving coils to guide the input device to the predicted next virtual key. Additionally or alternatively to one or more of the examples disclosed above, in some examples, an intensity of the one or more signals driving the one or more coils can correspond to a distance between the input device and a user interface element in the user interface. Additionally or alternatively to one or more of the examples disclosed above, in some examples, the one or more coils in the array of coils can be driven only while the user interface is displayed on the touch screen. Additionally or alternatively to one or more of the examples disclosed above, in some examples, the method can further comprise: measuring capacitive coupling between the input device and the touch screen, and estimating a location of the input device based on the capacitive coupling between the input device and the touch screen measured by the touch screen. The one or more coils in the array of coils can be driven only while the input device is touching the touch screen or within a threshold distance of the touch screen. Additionally or alternatively to one or more of the examples disclosed above, in some examples, the method can further comprise: measuring one or more induced currents in the array of coils in response to movement of the input device over the touch screen, and estimating a location of the input device based on the one or more induced currents measured in the array of coils. Additionally or alternatively to one or more of the examples disclosed above, in some examples, the method can further comprise: measuring capacitive coupling between the input device and the touch screen, estimating a location of the input device based on the capacitive coupling between the input device and the touch screen measured by the touch screen, and estimating a tilt of the input device based on the location of the input device estimated based on the one or more induced currents measured in the array of coils and based on the location of the input device estimated based on the capacitive coupling. Some examples of the disclosure are directed to a non-transitory computer readable storage medium. The non-transitory computer readable storage medium can store instructions, which when executed by an electronic device comprising a touch screen, an array of coils and one or more processors, can cause the one or more processors to perform any of the above methods.

Some examples of the disclosure are directed to a system comprising an input device and a host device. The input device can comprise a magnet. The host device can comprise: a touch screen; an array of coils disposed beneath the touch screen; and processing circuitry. The processing circuitry can be capable of driving one or more coils in the array of coils with one or more signals to generate one or more magnetic fields, the one or more magnetic fields exerting a force on the input device touching or proximate to the touch screen. Additionally or alternatively to one or more of the examples disclosed above, in some examples, driving the one or more coils with the one or more signals to generate the one or more magnetic fields can comprise driving a plurality of coils in the array of coils with a plurality of signals having different magnitudes to generate a magnetic field gradient, the magnetic field gradient exerting a lateral force on the input device. Additionally or alternatively to one or more of the examples disclosed above, in some examples, the force can comprise a pull force on the input device or a push force on the input device. Additionally or alternatively to one or more of the examples disclosed above, in some examples, driving the one or more coils with the one or more signals to generate the one or more magnetic fields can comprise driving a first coil of the array of coils with a first current having a first amplitude and concurrently driving a second coil of the array of coils with a second current having a second amplitude different from the first amplitude. Additionally or alternatively to one or more of the examples disclosed above, in some examples, driving the one or more coils with the one or more signals to generate one or more magnetic fields can comprise driving a first coil of the array of coils with a first current having a first amplitude and forgoing driving a second coil of the array of coils. Additionally or alternatively to one or more of the examples disclosed above, in some examples, driving the one or more coils with the one or more signals to generate the one or more magnetic fields can comprise driving a first coil of the array of coils with a first current having a first frequency and concurrently driving a second coil of the array of coils with a second current having a second frequency different from the first frequency. Additionally or alternatively to one or more of the examples disclosed above, in some examples, driving the one or more coils with the one or more signals can comprise driving a plurality of coils in a sequence to guide the input device. Additionally or alternatively to one or more of the examples disclosed above, in some examples, the processing circuitry can be further capable of displaying a user interface on the touch screen. Driving the one or more coils in the array of coils can comprise driving the one or more coils corresponding to one or more user interface elements in the user interface displayed on the touch screen. Additionally or alternatively to one or more of the examples disclosed above, in some examples, the user interface can include a character and driving the one or more coils corresponding to the user interface can comprise driving a plurality of coils corresponding to the character to guide the input device to trace the character. Additionally or alternatively to one or more of the examples disclosed above, in some examples, the user interface can comprise a user interface control including one or more buttons and driving the one or more coils corresponding to the user interface can comprise driving coils corresponding to the one or more buttons to exert a push or pull force on the input device. Additionally or alternatively to one or more of the examples disclosed above, in some examples, the user interface control can comprise a first button and a second button, one or more first coils corresponding to the first button can be driven to exert a push force on the input device, and one or more second coils corresponding to the second button can be driven to exert a pull force on the input device. Additionally or alternatively to one or more of the examples disclosed above, in some examples, the user interface can comprise a virtual keyboard including one or more virtual keys and driving the one or more coils corresponding to the user interface can comprise predicting a next virtual key and driving coils to guide the input device to the predicted next virtual key. Additionally or alternatively to one or more of the examples disclosed above, in some examples, an intensity of the one or more signals driving the one or more coils can correspond to a distance between the input device and a user interface element in the user interface. Additionally or alternatively to one or more of the examples disclosed above, in some examples, the one or more coils in the array of coils can be driven only while the user interface is displayed on the touch screen. Additionally or alternatively to one or more of the examples disclosed above, in some examples, the processing circuitry can be further capable of: measuring capacitive coupling between the input device and the touch screen, and estimating a location of the input device based on the capacitive coupling between the input device and the touch screen measured by the touch screen. The one or more coils in the array of coils can be driven only while the input device is touching the touch screen or within a threshold distance of the touch screen. Additionally or alternatively to one or more of the examples disclosed above, in some examples, the processing circuitry can be further capable of: measuring one or more induced currents in the array of coils in response to movement of the input device over the touch screen, and estimating a location of the input device based on the one or more induced currents measured in the array of coils. Additionally or alternatively to one or more of the examples disclosed above, in some examples, the processing circuitry can be further capable of: measuring capacitive coupling between the input device and the touch screen, estimating a location of the input device based on the capacitive coupling between the input device and the touch screen measured by the touch screen, and estimating a tilt of the input device based on the location of the input device estimated based on the one or more induced currents measured in the array of coils and based on the location of the input device estimated based on the capacitive coupling.

Some examples of the disclosure are directed to an electronic device. The electronic device can comprise a touch screen, an array of coils disposed beneath the touch screen, and processing circuitry. The processing circuitry can be capable of displaying a user interface on the touch screen and measuring capacitive coupling between an input device and the touch screen. In accordance with a determination that the input device is within a threshold distance of the touch screen, the processing can be further capable of driving one or more coils in the array of coils with one or more signals to generate one or more magnetic fields, the one or more magnetic fields exerting a force on the input device touching or proximate to the touch screen. Driving the one or more coils in the array of coils comprises driving the one or more coils corresponding to one or more user interface elements in the user interface displayed on the touch screen. In accordance with a determination that the input device is not within the threshold distance of the touch screen, the processing circuitry can be capable of forgoing driving the one or more coils in the array of coils with the one or more signals. Additionally or alternatively to one or more of the examples disclosed above, in some examples, driving the one or more coils with the one or more signals to generate the one or more magnetic fields can comprise driving a plurality of coils in the array of coils with a plurality of signals having different magnitudes to generate a magnetic field gradient, the magnetic field gradient exerting a lateral force on the input device. Additionally or alternatively to one or more of the examples disclosed above, in some examples, the force can comprise a pull force on the input device or a push force on the input device. Additionally or alternatively to one or more of the examples disclosed above, in some examples, driving the one or more coils with the one or more signals to generate the one or more magnetic fields can comprise driving a first coil of the array of coils with a first current having a first amplitude and concurrently driving a second coil of the array of coils with a second current having a second amplitude different from the first amplitude. Additionally or alternatively to one or more of the examples disclosed above, in some examples, driving the one or more coils with the one or more signals to generate one or more magnetic fields can comprise driving a first coil of the array of coils with a first current having a first amplitude and forgoing driving a second coil of the array of coils. Additionally or alternatively to one or more of the examples disclosed above, in some examples, driving the one or more coils with the one or more signals to generate the one or more magnetic fields can comprise driving a first coil of the array of coils with a first current having a first frequency and concurrently driving a second coil of the array of coils with a second current having a second frequency different from the first frequency. Additionally or alternatively to one or more of the examples disclosed above, in some examples, driving the one or more coils with the one or more signals can comprise driving a plurality of coils in a sequence to guide the input device. Additionally or alternatively to one or more of the examples disclosed above, in some examples, the user interface can include a character and driving the one or more coils corresponding to the user interface can comprise driving a plurality of coils corresponding to the character in a sequence to guide the input device to trace the character. Additionally or alternatively to one or more of the examples disclosed above, in some examples, the user interface can comprise a user interface control including a first button and a second button, and driving the one or more coils corresponding to the user interface can comprise driving coils corresponding to the first button to exert a push force on the input device touching or proximate to the first button and driving coils corresponding to the second button to exert a pull force on the input device touching or proximate to the second button. Additionally or alternatively to one or more of the examples disclosed above, in some examples, the user interface can comprise a user interface control including a first button and a second button, and driving the one or more coils corresponding to the user interface can comprise driving coils corresponding to the first button to exert a lateral force in a first direction on the input device touching or proximate to the first button and driving coils corresponding to the second button to exert a lateral force in a second direction, opposite the first direction, on the input device touching or proximate to the second button. Additionally or alternatively to one or more of the examples disclosed above, in some examples, the user interface can comprise a virtual keyboard including one or more virtual keys and driving the one or more coils corresponding to the user interface can comprise driving the one or more coils based on a predicted next virtual key and to guide the input device toward the predicted next virtual key. Additionally or alternatively to one or more of the examples disclosed above, in some examples, the processing circuitry can be further capable of estimating a location of the input device based on the capacitive coupling between the input device and the touch screen measured by the touch screen. The one or more coils in the array of coils can be driven only while the input device is touching or within a threshold distance of the one or more user interface elements.

Some examples of the disclosure are directed to a method. The method can comprise displaying a user interface on a touch screen and measuring capacitive coupling between an input device and the touch screen. In accordance with a determination that the input device is within a threshold distance of the touch screen, the method further comprises driving one or more coils in an array of coils with one or more signals to generate one or more magnetic fields, the one or more magnetic fields exerting a force on the input device touching or proximate to the touch screen. Driving the one or more coils in the array of coils can comprises driving the one or more coils corresponding to one or more user interface elements in the user interface displayed on the touch screen. In accordance with a determination that the input device is not within the threshold distance of the touch screen, the method can comprise forgoing driving the one or more coils in the array of coils with the one or more signals. Additionally or alternatively to one or more of the examples disclosed above, in some examples, driving the one or more coils with the one or more signals to generate the one or more magnetic fields can comprise driving a plurality of coils in the array of coils with a plurality of signals having different magnitudes to generate a magnetic field gradient, the magnetic field gradient exerting a lateral force on the input device. Additionally or alternatively to one or more of the examples disclosed above, in some examples, the force can comprise a normal pull force on the input device, a normal push force on the input device, or a lateral force to guide the input device across the touch screen. Additionally or alternatively to one or more of the examples disclosed above, in some examples, driving the one or more coils with the one or more signals to generate the one or more magnetic fields can comprise driving a first coil of the array of coils with a first current having a first amplitude and concurrently driving a second coil of the array of coils with a second current having a second amplitude different from the first amplitude. Additionally or alternatively to one or more of the examples disclosed above, in some examples, driving the one or more coils with the one or more signals to generate the one or more magnetic fields can comprise driving a first coil of the array of coils with a first current having a first amplitude and forgoing driving a second coil of the array of coils. Additionally or alternatively to one or more of the examples disclosed above, in some examples, driving the one or more coils with the one or more signals to generate the one or more magnetic fields can comprise driving a first coil of the array of coils with a first current having a first frequency and concurrently driving a second coil of the array of coils with a second current having a second frequency different from the first frequency. Additionally or alternatively to one or more of the examples disclosed above, in some examples, driving the one or more coils with the one or more signals can comprise driving a plurality of coils in a sequence to guide the input device. Additionally or alternatively to one or more of the examples disclosed above, in some examples, the user interface can comprise a first user interface element and a second user interface element. Driving the one or more coils with the one or more signals can comprise driving coils corresponding to the first user interface element to exert a first force in a first direction on the input device touching or proximate to the first user interface element and driving coils corresponding to the second user interface element to exert a second force in a second direction, opposite the first direction, on the input device touching or proximate to the second user interface element. Additionally or alternatively to one or more of the examples disclosed above, in some examples, the user interface can include a character and driving the one or more coils corresponding to the user interface can comprise driving a plurality of coils corresponding to the character to guide the input device to trace the character. Additionally or alternatively to one or more of the examples disclosed above, in some examples, the user interface can comprise a user interface control including one or more buttons and driving the one or more coils corresponding to the user interface can comprise driving coils corresponding to the one or more buttons to exert a push or pull force on the input device. Additionally or alternatively to one or more of the examples disclosed above, in some examples, the user interface control can comprise a first button and a second button. One or more first coils corresponding to the first button can be driven to exert a push force on the input device and one or more second coils corresponding to the second button can be driven to create a pull force on the input device. Additionally or alternatively to one or more of the examples disclosed above, in some examples, the user interface can comprise a virtual keyboard including one or more virtual keys. Driving the one or more coils corresponding to the user interface can comprise predicting a next virtual key and driving coils to guide the input device to the predicted next virtual key. Additionally or alternatively to one or more of the examples disclosed above, in some examples, an intensity of the one or more signals driving the one or more coils can correspond to a distance between the input device and a user interface element in the user interface. Additionally or alternatively to one or more of the examples disclosed above, in some examples, the one or more coils in the array of coils can be driven only while the user interface is displayed on the touch screen. Additionally or alternatively to one or more of the examples disclosed above, in some examples, the method can further comprise: estimating a location of the input device based on the capacitive coupling between the input device and the touch screen measured by the touch screen. The one or more coils in the array of coils can be driven only while the input device is touching or within a threshold distance of the one or more user interface elements. Additionally or alternatively to one or more of the examples disclosed above, in some examples, the method can further comprise: measuring one or more induced currents in the array of coils in response to movement of the input device over the touch screen, and estimating a location of the input device based on the one or more induced currents measured in the array of coils. Additionally or alternatively to one or more of the examples disclosed above, in some examples, the method can further comprise: measuring capacitive coupling between the input device and the touch screen, estimating a location of the input device based on the capacitive coupling between the input device and the touch screen measured by the touch screen, and estimating a tilt of the input device based on the location of the input device estimated based on the one or more induced currents measured in the array of coils and based on the location of the input device estimated based on the capacitive coupling. Some examples of the disclosure are directed to a non-transitory computer readable storage medium. The non-transitory computer readable storage medium can store instructions, which when executed by an electronic device comprising a touch screen, an array of coils and one or more processors, can cause the one or more processors to perform any of the above methods.

Some examples of the disclosure are directed to a system comprising an input device and a host device. The input device can comprise a magnet. The host device can comprise: a touch screen; an array of coils disposed beneath the touch screen; and processing circuitry. The processing circuitry can be capable of displaying a user interface on the touch screen and measuring capacitive coupling between the input device and the touch screen. In accordance with a determination that the input device is within a threshold distance of the touch screen, the processing can be further capable of driving one or more coils in the array of coils with one or more signals to generate one or more magnetic fields, the one or more magnetic fields exerting a force on the input device touching or proximate to the touch screen. Driving the one or more coils in the array of coils comprises driving the one or more coils corresponding to one or more user interface elements in the user interface displayed on the touch screen. In accordance with a determination that the input device is not within the threshold distance of the touch screen, the processing circuitry can be capable of forgoing driving the one or more coils in the array of coils with the one or more signals. Additionally or alternatively to one or more of the examples disclosed above, in some examples, driving the one or more coils with the one or more signals to generate the one or more magnetic fields can comprise driving a plurality of coils in the array of coils with a plurality of signals having different magnitudes to generate a magnetic field gradient, the magnetic field gradient exerting a lateral force on the input device. Additionally or alternatively to one or more of the examples disclosed above, in some examples, the force can comprise a pull force on the input device or a push force on the input device. Additionally or alternatively to one or more of the examples disclosed above, in some examples, driving the one or more coils with the one or more signals to generate the one or more magnetic fields can comprise driving a first coil of the array of coils with a first current having a first amplitude and concurrently driving a second coil of the array of coils with a second current having a second amplitude different from the first amplitude. Additionally or alternatively to one or more of the examples disclosed above, in some examples, driving the one or more coils with the one or more signals to generate one or more magnetic fields can comprise driving a first coil of the array of coils with a first current having a first amplitude and forgoing driving a second coil of the array of coils. Additionally or alternatively to one or more of the examples disclosed above, in some examples, driving the one or more coils with the one or more signals to generate the one or more magnetic fields can comprise driving a first coil of the array of coils with a first current having a first frequency and concurrently driving a second coil of the array of coils with a second current having a second frequency different from the first frequency. Additionally or alternatively to one or more of the examples disclosed above, in some examples, driving the one or more coils with the one or more signals can comprise driving a plurality of coils in a sequence to guide the input device. Additionally or alternatively to one or more of the examples disclosed above, in some examples, the user interface can include a character and driving the one or more coils corresponding to the user interface can comprise driving a plurality of coils corresponding to the character in a sequence to guide the input device to trace the character. Additionally or alternatively to one or more of the examples disclosed above, in some examples, the user interface can comprise a user interface control including a first button and a second button, and driving the one or more coils corresponding to the user interface can comprise driving coils corresponding to the first button to exert a push force on the input device touching or proximate to the first button and driving coils corresponding to the second button to exert a pull force on the input device touching or proximate to the second button. Additionally or alternatively to one or more of the examples disclosed above, in some examples, the user interface can comprise a user interface control including a first button and a second button, and driving the one or more coils corresponding to the user interface can comprise driving coils corresponding to the first button to exert a lateral force in a first direction on the input device touching or proximate to the first button and driving coils corresponding to the second button to exert a lateral force in a second direction, opposite the first direction, on the input device touching or proximate to the second button. Additionally or alternatively to one or more of the examples disclosed above, in some examples, the user interface can comprise a virtual keyboard including one or more virtual keys and driving the one or more coils corresponding to the user interface can comprise driving the one or more coils based on a predicted next virtual key and to guide the input device toward the predicted next virtual key. Additionally or alternatively to one or more of the examples disclosed above, in some examples, the processing circuitry can be further capable of estimating a location of the input device based on the capacitive coupling between the input device and the touch screen measured by the touch screen. The one or more coils in the array of coils can be driven only while the input device is touching or within a threshold distance of the one or more user interface elements.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. An electronic device comprising:
   a touch screen;
   an array of coils disposed beneath the touch screen; and processing circuitry configured to:
  display a user interface on the touch screen;
  measure capacitive coupling between an input device and the touch screen;
  in accordance with a determination that the input device is within a threshold distance of the touch screen, drive one or more coils in the array of coils with one or more signals to generate one or more magnetic fields, the one or more magnetic fields exerting a force on the input device touching or proximate to the touch screen, wherein driving the one or more coils in the array of coils comprises driving the one or more coils corresponding to one or more user interface elements in the user interface displayed on the touch screen; and
  in accordance with a determination that the input device is not within the threshold distance of the touch screen, forgo driving the one or more coils in the array of coils with the one or more signals.

2. The electronic device of claim 1, wherein driving the one or more coils with the one or more signals to generate the one or more magnetic fields comprises driving a plurality of coils in the array of coils with a plurality of signals having different magnitudes to generate a magnetic field gradient, the magnetic field gradient exerting a lateral force on the input device.

3. The electronic device of claim 1, wherein the force comprises a pull force on the input device or a push force on the input device.

4. The electronic device of claim 1, wherein driving the one or more coils with the one or more signals to generate the one or more magnetic fields comprises driving a first coil of the array of coils with a first current having a first amplitude and concurrently driving a second coil of the array of coils with a second current having a second amplitude different from the first amplitude.

5. The electronic device of claim 1, wherein driving the one or more coils with the one or more signals to generate the one or more magnetic fields comprises driving a first coil of the array of coils with a first current having a first frequency and concurrently driving a second coil of the array of coils with a second current having a second frequency different from the first frequency.

6. The electronic device of claim 1, wherein driving the one or more coils with the one or more signals to generate one or more magnetic fields comprises driving a first coil of the array of coils with a first current having a first amplitude and forgoing driving a second coil of the array of coils.

7. The electronic device of claim 1, wherein driving the one or more coils with the one or more signals comprises driving a plurality of coils in a sequence to guide the input device.

8. The electronic device of claim 1, wherein the user interface includes a character and wherein driving the one or more coils corresponding to the user interface comprises driving a plurality of coils corresponding to the character in a sequence to guide the input device to trace the character.

9. The electronic device of claim 1, wherein the user interface comprises a user interface control including a first button and a second button, and wherein driving the one or more coils corresponding to the user interface comprises driving coils corresponding to the first button to exert a push force on the input device touching or proximate to the first button and driving coils corresponding to the second button to exert a pull force on the input device touching or proximate to the second button.

10. The electronic device of claim 1, wherein the user interface comprises a user interface control including a first button and a second button, and wherein driving the one or more coils corresponding to the user interface comprises driving coils corresponding to the first button to exert a lateral force in a first direction on the input device touching or proximate to the first button and driving coils corresponding to the second button to exert a lateral force in a second direction, opposite the first direction, on the input device touching or proximate to the second button.

11. The electronic device of claim 1, wherein the user interface comprises a virtual keyboard including one or more virtual keys and wherein driving the one or more coils corresponding to the user interface comprises driving the one or more coils based on a predicted next virtual key and to guide the input device toward the predicted next virtual key.

12. The electronic device of claim 1, the processing circuitry further configured to:
  estimate a location of the input device based on the capacitive coupling between the input device and the touch screen measured by the touch screen;
  wherein the one or more coils in the array of coils are driven only while the input device is touching or within a threshold distance of the one or more user interface elements.

13. A method comprising:
  displaying a user interface on a touch screen;
  measuring capacitive coupling between an input device and the touch screen;
  in accordance with a determination that the input device is within a threshold distance of the touch screen, driving one or more coils in an array of coils with one or more signals to generate one or more magnetic fields, the one or more magnetic fields exerting a force on the input device touching or proximate to the touch screen, wherein driving the one or more coils in the array of coils comprises driving the one or more coils corresponding to one or more user interface elements in the user interface displayed on the touch screen; and
  in accordance with a determination that the input device is not within the threshold distance of the touch screen, forgoing driving the one or more coils in the array of coils with the one or more signals.

14. The method of claim 13, wherein driving the one or more coils with the one or more signals to generate the one or more magnetic fields comprises driving a plurality of coils in the array of coils with a plurality of signals having different magnitudes to generate a magnetic field gradient, the magnetic field gradient exerting a lateral force on the input device.

15. The method of claim 13, wherein driving the one or more coils with the one or more signals comprises driving a plurality of coils in a sequence to guide the input device.

16. The method of claim 13, wherein the user interface comprises a first user interface element and a second user interface element, wherein driving the one or more coils with the one or more signals comprises driving coils corresponding to the first user interface element to exert a first force in a first direction on the input device touching or proximate to the first user interface element and driving coils corresponding to the second user interface element to exert a second force in a second direction, opposite the first direction, on the input device touching or proximate to the second user interface element.

17. The method of claim 13, wherein the one or more coils in the array of coils are driven only while the user interface is displayed on the touch screen.

18. The method of claim 13, the method further comprising:
   estimating a location of the input device based on the capacitive coupling between the input device and the touch screen measured by the touch screen;
   wherein the one or more coils in the array of coils are driven only while the input device is touching or within a threshold distance of the one or more user interface elements.

19. The method of claim 13, the method further comprising:
   measuring one or more induced currents in the array of coils in response to movement of the input device over the touch screen; and
   estimating a location of the input device based on the one or more induced currents measured in the array of coils.

20. A system comprising:
   an input device comprising a magnet; and
   a host device comprising:
      a touch screen;
      an array of coils disposed beneath the touch screen; and
      processing circuitry configured to:
         display a user interface on the touch screen;
         measure capacitive coupling between the input device and the touch screen;
         in accordance with a determination that the input device is within a threshold distance of the touch screen, drive one or more coils in the array of coils with one or more signals to generate one or more magnetic fields, the one or more magnetic fields exerting a force on the input device touching or proximate to the touch screen, wherein driving the one or more coils in the array of coils comprises driving the one or more coils corresponding to one or more user interface elements in the user interface displayed on the touch screen; and
         in accordance with a determination that the input device is not within the threshold distance of the touch screen, forgo driving the one or more coils in the array of coils with the one or more signals.

* * * * *